United States Patent
Iwamoto et al.

(10) Patent No.: US 6,666,784 B1
(45) Date of Patent: Dec. 23, 2003

(54) PISTON ROD PISTON DETECTOR, AUTOTENSIONER AND BELT TENSION ADJUSTER

(75) Inventors: Kenichi Iwamoto, Shizuoka (JP); Takashi Koike, Shizuoka (JP); Kazuyuki Inokuchi, Shizuoka (JP); Motoharu Niki, Osaka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/679,809

(22) Filed: Oct. 5, 2000

(30) Foreign Application Priority Data

| Oct. 6, 1999 | (JP) | 11-285383 |
| Jan. 28, 2000 | (JP) | 2000-019947 |
| Mar. 10, 2000 | (JP) | 2000-066418 |
| Apr. 4, 2000 | (JP) | 2000-102487 |

(51) Int. Cl.⁷ .............. F16H 7/08; F16K 3/00; G08G 3/10
(52) U.S. Cl. .............. 474/109; 474/110; 474/101; 474/135; 474/133; 137/554; 340/686.1; 340/668; 324/207.24
(58) Field of Search ............... 324/207.2, 207.24; 137/554; 474/109, 110, 111, 107–108, 138, 135, 133, 136, 102; 310/30, 14; 340/686.1, 686.3, 668

(56) References Cited

U.S. PATENT DOCUMENTS

| 4,478,595 A | * | 10/1984 | Hayakawa et al. | 474/109 |
| 4,759,256 A | * | 7/1988 | Kovit et al. | 254/277 |
| 5,033,400 A | * | 7/1991 | Fischer | 112/254 |
| 5,186,689 A | | 2/1993 | Yamamoto et al. | 474/112 |
| 5,257,014 A | * | 10/1993 | Zimmermann | 340/686.1 |
| 5,383,813 A | * | 1/1995 | Odai | 474/110 |
| 5,523,684 A | * | 6/1996 | Zimmermann | 324/207.2 |
| 5,609,399 A | * | 3/1997 | Feigel et al. | 188/162 |
| 5,620,385 A | * | 4/1997 | Cascionale et al. | 474/135 |
| 5,693,267 A | * | 12/1997 | Beshore et al. | 261/142 |
| 5,702,317 A | | 12/1997 | Kawashima et al. | 474/110 |
| 6,165,091 A | * | 12/2000 | Dinca et al. | 474/101 |
| 6,188,151 B1 | * | 2/2001 | Livshits et al. | 310/30 |
| 6,321,781 B1 | * | 11/2001 | Kurth | 137/554 |

FOREIGN PATENT DOCUMENTS

| EP | 237-493 A1 | * | 9/1987 | |
| GB | 2050550 A | * | 1/1981 | |
| JP | (62-93556) A | | 4/1984 | 474/135 |
| JP | 62-31757 | * | 2/1987 | |
| JP | (62-72949) A | | 4/1987 | 474/102 |
| JP | (02-118252) A | | 5/1990 | 474/112 |
| JP | 3-13647 | | 3/1991 | |
| JP | (03-213752) A | | 9/1991 | 474/133 |
| JP | 7-117130 | | 12/1995 | |

* cited by examiner

Primary Examiner—Marcus Charles
(74) Attorney, Agent, or Firm—Wenderoth, Lind & Ponack, L.L.P.

(57) ABSTRACT

A piston rod position detecting mechanism is proposed which can detect continuously or in a multiple-point manner that the piston rod position has changed due to increase or decrease in the protruding amount of the piston rod due to aging. The protruding amount from a cylinder end wall is detected by a position detecting mechanism comprising a detecting coil housed in a bobbin provided at the cylinder end, a flange portion formed on the piston rod, and a coil spring. Also, an autotensioner and an electromagnetic valve with such a position detector are proposed. Further, a belt tension adjusting device is provided with a detector for detecting the position of a tension pulley which is pivotable with increase or decrease in the belt tension.

32 Claims, 27 Drawing Sheets

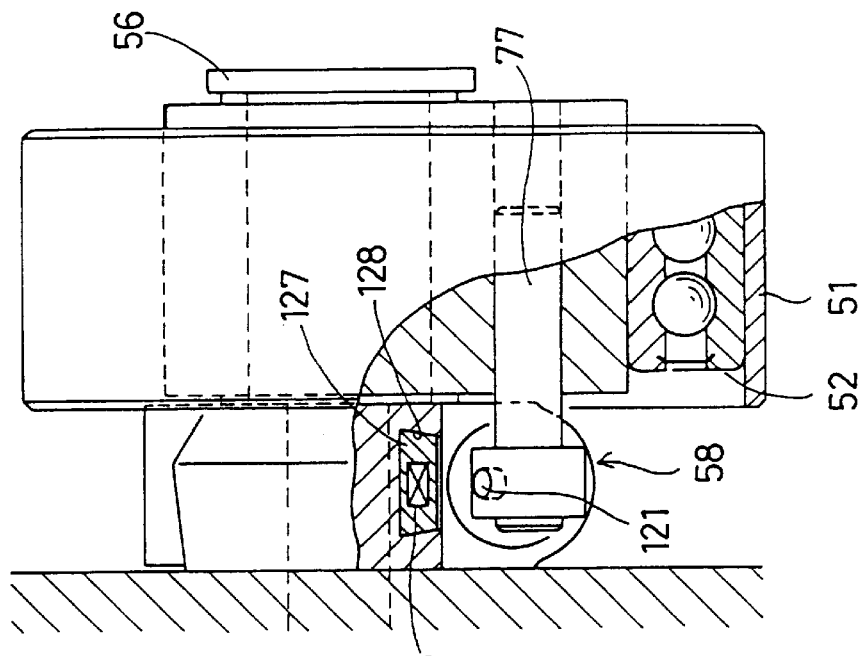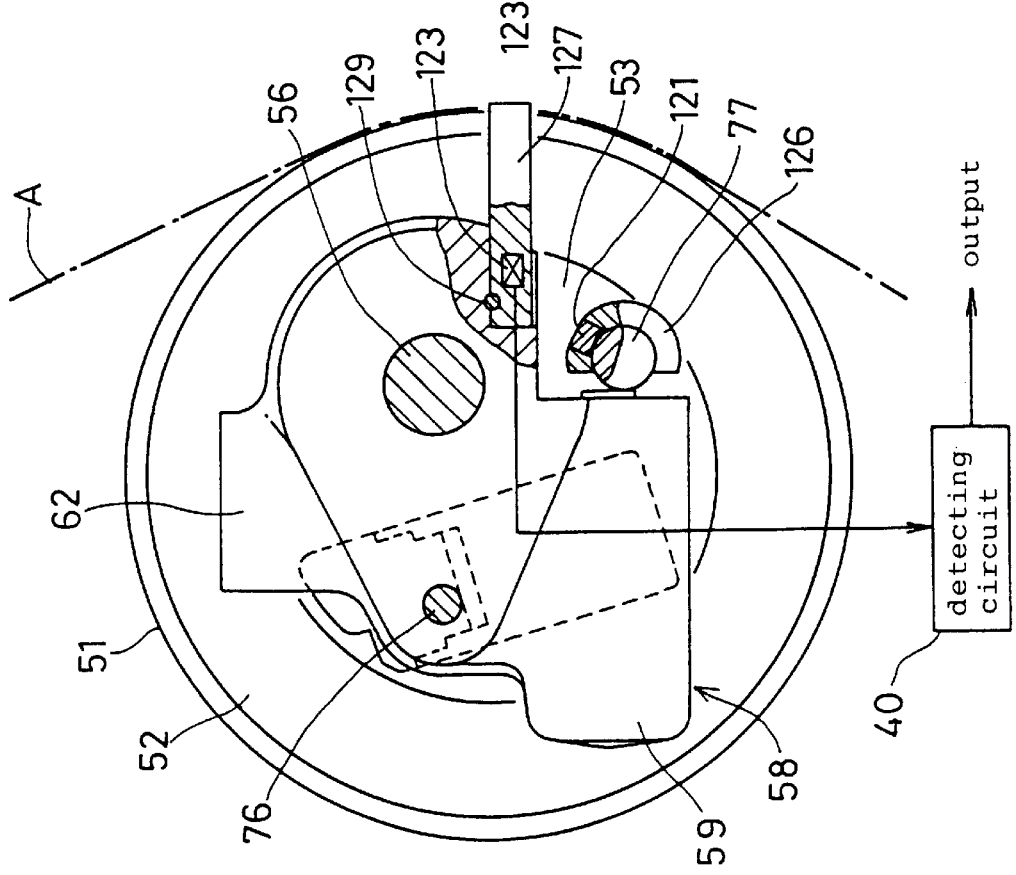

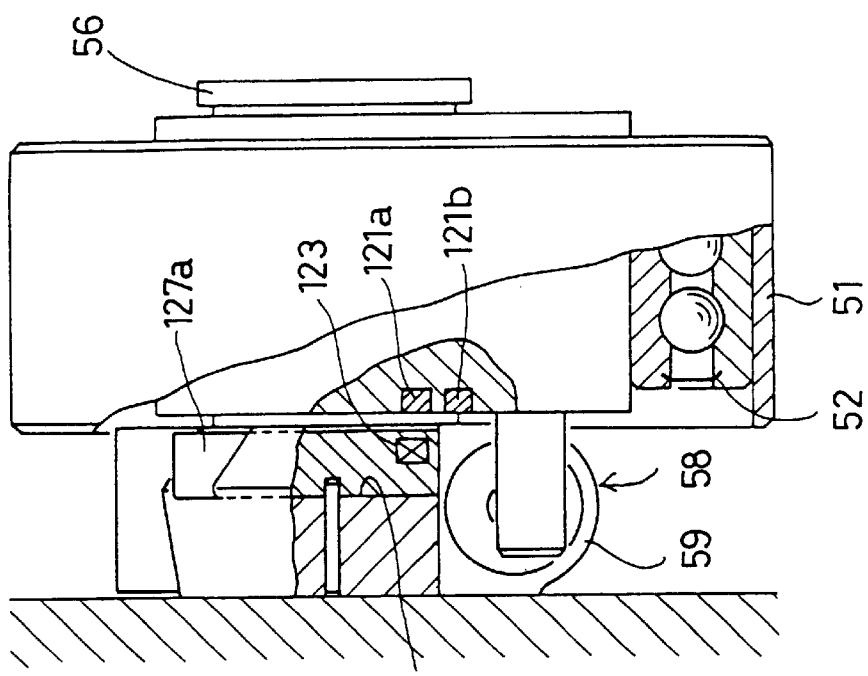
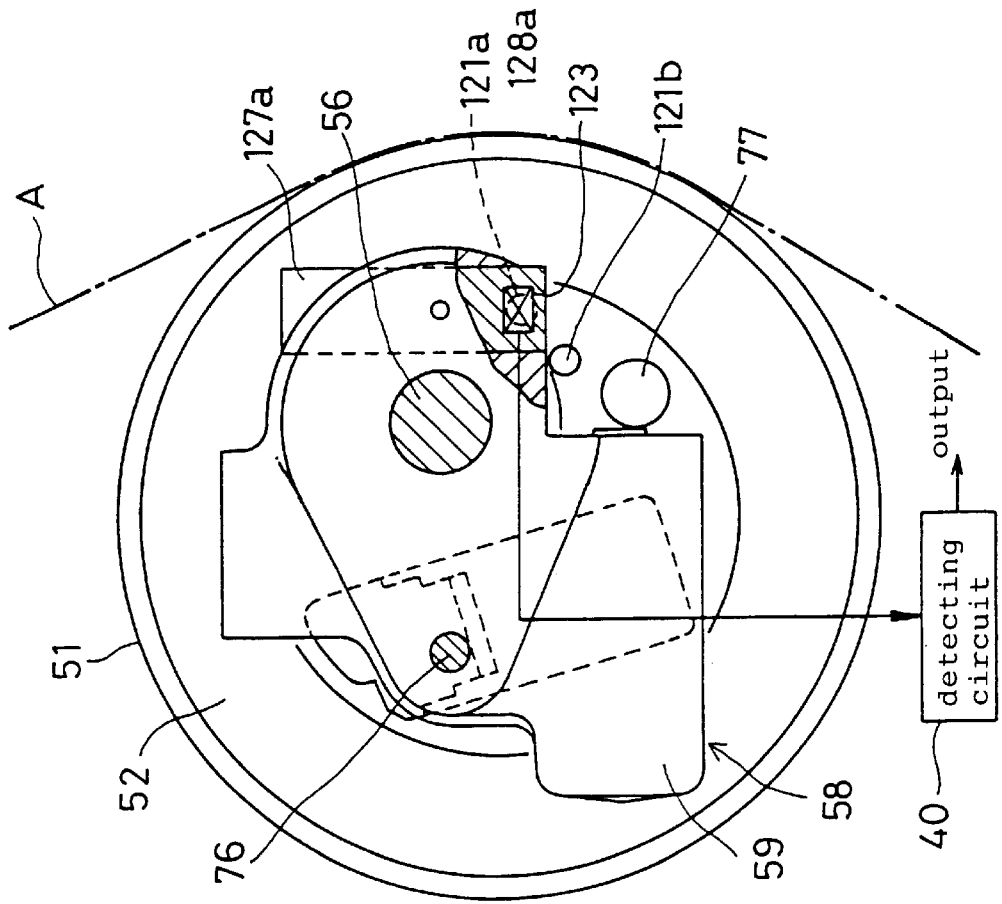
FIG. 29A
FIG. 29B

PISTON ROD PISTON DETECTOR, AUTOTENSIONER AND BELT TENSION ADJUSTER

BACKGROUND OF THE INVENTION

This invention relates to a piston rod position detector for detecting the position of a piston rod connected to a piston slidably mounted in a cylinder so as to protrude from the cylinder. It also relates to an autotensioner and a belt transmission device carrying such a piston rod position detector and to a belt tension adjusting device with a tension pulley position detector.

A cylinder unit is used to convert hydraulic force to mechanical force and transmit the mechanical force to a device through a piston rod. It is also used to measure a moving distance.

A cylinder unit of the former type is shown in FIG. 12 and is generally called an "autotensioner" in the art and is used to apply tension to the timing belt in a belt transmission device.

FIG. 12 shows such a belt transmission device used to drive automotive engine camshafts. It comprises a pulley P1 mounted on an engine crankshaft 1, pulleys P2 mounted on camshafts 2, a pulley P3 mounted on an oil pump drive shaft 3, and a timing belt 4 trained around these pulleys. The camshafts 2 and the drive shaft 3 are driven as the crankshaft 1 rotates. The belt transmission device further includes a belt tension adjustor comprising a tension pulley 9 rotatably mounted on a pulley arm 6 which is pivotable about a shaft 5, and an autotensioner 7 having a pushrod 8 protruding from a cylinder and biased by a spring, not shown, to press the tension pulley 9 against the belt 4 to absorb any change in belt tension, thereby keeping the belt tension constant.

The tension in the belt changes as it stretches gradually with time or due to changes in the distance between pulleys due to thermal expansion during operation of the engine. The autotensioner absorbs any such change in the belt tension by advancing and retracting the pushrod. For example, when the belt stretches and slackens, the pushrod 8 advances to absorb slack of the belt.

Such autotensioners are disclosed e.g. in Japanese patent No. 1891868 and Japanese patent publication 7-117130.

If the belt transmission system has no such autotensioner, it is usually necessary to exchange the timing belt each time the vehicle has traveled 100 thousand kilometers. The autotensioner suppresses flapping of the belt and thus prolongs its life, so that the belt guarantee period can be extended until the vehicle travel distance far exceeds 100 thousand kilometers.

But since the pushrod stroke is limited, if the pushrod has advanced beyond its stroke limit, the autotensioner loses its ability to keep constant the belt tension. The belt thus tends to get slack and begins to flap. This may cause flapping or "jump of pulley teeth". Also, flapping of the belt shortens the life of the belt. Also, the timing belt stretches, so that the pushrod protrudes too much and the timing belts fails to function properly. One may therefore think of providing a means for detecting the fact that the pushrod has advanced to the stroke limit or to a position near the stroke limit. A specific such means would be a detector including a sensor (coil) and a nonmagnetic ring fitted on the push rod. When the edge of the nonmagnetic ring reaches the center of the sensor, magnetic permeability changes. The detector thus detects a specific position of the pushrod.

But with this arrangement, only one specific position of the pushrod is detectable. Thus, it is desired to detect the position continuously or a plurality of different positions of the pushrod.

As with an autotensioner, in spite of the fact that it is known that as the travel distance of a vehicle increases, a timing belt stretches unnoticed and the position of the pushrod of the autotensioner changes, the change in the amount of protrusion of the pushrod is not actually detected. During the process of increase in the amount of protrusion of the pushrod, if alarms such as "caution" at half the elongation at expected breakage, "warning" at 80% elongation, and "broken" at the breakage point are given according to the elongation of the belt, measures regarding an exchange period of the belt can be taken. But no such measures are taken now. Also, there are various kinds of devices for which it is desirable to take similar measures like autotensioners.

An object of the invention is to provide a piston rod position detector capable of detecting the position of a piston rod continuously or at a plurality of different positions and to provide an autotensioner provided with such a detector.

FIG. 33 shows a belt transmission device with a belt tension adjustor which is another type of autotensioner.

A timing belt 4 is trained between a pulley P1 of a crankshaft 1, pulleys P2 of camshafts 2, and a pulley P3 of a drive shaft 3 for an oil pump. The autotensioner shown is one disclosed in Japanese patent publication 8-338488 and is a compact type autotensioner in which a hydraulic damper is housed in the periphery of a tension pulley 9 for compactness.

For the autotensioner, the tension pulley 9 is provided so as to be pressed against the timing belt 4 so as to be pivotable about a shaft 5, and keeps the tension of the timing belt constant by the tension adjusting force of a spring and the hydraulic damper. The tension pulley 9 pivots counterclockwise to relax tension when the tension is excessive, and pivots clockwise when the tension is decreasing to adjust tension. As the use period extends, the entire length of the timing belt tends to stretch due to secular change. Thus, as the operating period and use period extend, the tension pulley 9 of the autotensioner pivots clockwise.

The pivoting angle of the tension pulley in the autotensioner is limited, so that as operation exceeding the pivot limit point continues, it becomes impossible to keep the tension of the timing belt constant. The tension of the timing belt decreases, so that due to flapping of the timing belt, the belt tends to deteriorate. This will ultimately cause breakage of the belt.

But no detecting mechanism is provided for detecting the pivoting angle of the tension pulley to detect whether or not it is operated beyond the pivot limit point. Thus, it is impossible to know if the tension of the timing belt is kept properly, and to properly judge the period for exchanging the timing belt, and thus to know beforehand even if there is an abnormality in the autotensioner.

Another object of this invention is to provide a belt tension adjusting device provided with a means for detecting the position of the tension pulley and indicating the exchange period of the timing belt or abnormality of the autotensioner.

SUMMARY OF THE INVENTION

According to this invention, there is provided a piston rod position detecting mechanism for detecting the position of a piston rod connected to a piston slidably mounted in a cylinder having both ends thereof closed, the mechanism comprising a detecting coil provided at one end of the cylinder from which the piston rod protrudes out of the cylinder, and a flange provided on the piston rod opposite to the detecting coil to detect the position of the piston rod by a detection signal based on a change in inductance of the detecting coil which changes with the change in the position of the flange and thus the piston rod.

According to this invention, there is also provided an autotensioner comprising a cylinder having both ends closed, a piston slidably mounted in the cylinder, a piston rod connected to the piston to protrude from one end of the cylinder, a pressure chamber and a reservoir chamber defined in the cylinder by the piston, the pressure chamber and the reservoir chamber being filled with hydraulic oil, and a rod spring for biasing the piston rod so as to protrude out of the cylinder, characterized in that the position detecting mechanism described above is provided at an end at which the piston rod protrudes from the cylinder.

According to this invention, there is also provided an electromagnetic valve comprising a cylinder having both ends closed, a piston slidably mounted in the cylinder, a pair of electromagnetic coils provided at both sides of the piston, a piston rod coupled to at least one side of the piston so that the piston rod has one end thereof protruding out of the cylinder, the piston being driven by the magnetic force of the electromagnetic coils to protrude one end of the piston rod out of the cylinder, characterized in that the position detecting mechanism described above is provided.

According to this invention, there is also provided a belt transmission device comprising a pulley mounted on a crankshaft, a pulley mounted on a shaft to be driven, a belt trained around the pulleys to drive the shaft, an autotensioner including an engaging member, a cylinder, a pushrod mounted in the cylinder, a tension adjusting spring and a damper mechanism for damping the vibration of the belt through the engaging member, and a detecting unit for detecting the axial position of the pushrod.

According to this invention, there is also provided a belt tension adjusting device comprising an inner member supported so as to be pivotable about a fixing bolt passing through an eccentric hole formed in the inner member, a tension pulley rotatably mounted on the inner member, a tension adjusting spring and a hydraulic damper for pivoting the inner member and thus the tension pulley to adjust tension of a belt, and a magnetic sensor for detecting the position of the tension pulley.

BRIEF DESCRIPTION OF THE DRAWINGS

FIGS. 27A and 27B are a partially cutaway a side view and a sectional view of a belt tension adjustor of a fourth embodiment;

FIGS. 29A, 29B and 30 are similar views showing a belt tension adjustor of a fifth embodiment;

DETAILED DESCRIPTION OF THE PREFERRED EMBODIMENTS

Figure 1:
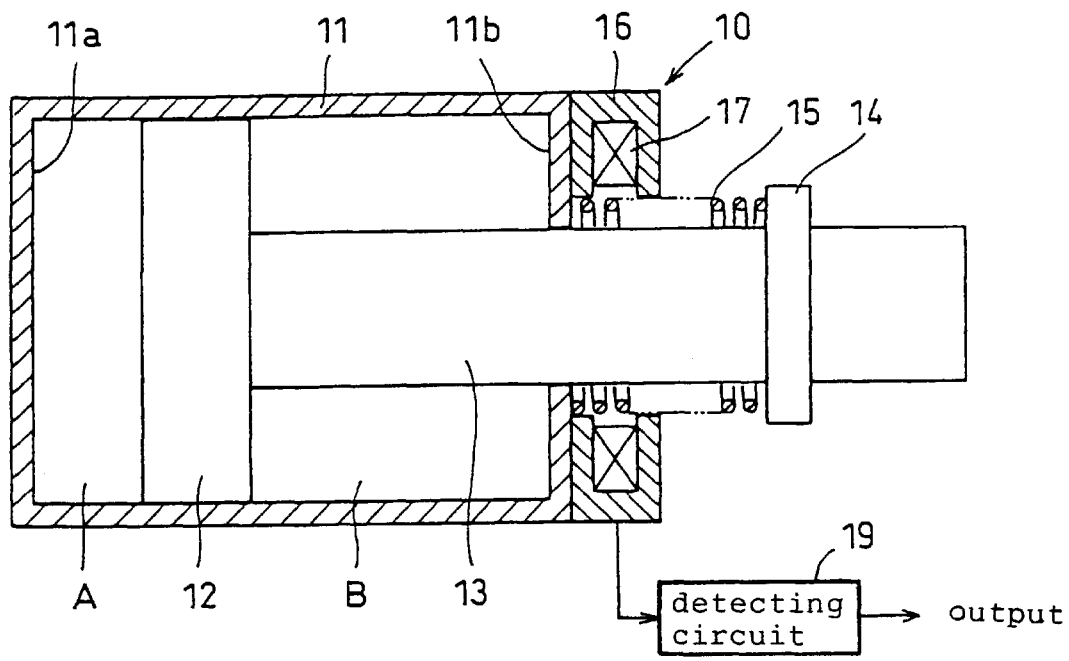
FIG. 1 is a sectional view of a cylinder unit with a position dection unit of a first embodiment.

FIG. 1 shows a first embodiment, in which the cylinder unit 10 includes a cylinder 11 having end walls 11a, 11b. A piston 12 is slidably received in the cylinder 11 to define chambers A and B in the cylinder. A piston rod 13 is secured to the piston 12 and has one end thereof protruding from the cylinder through the end wall 11b. At the protruding end, the piston rod 13 carries a flange 14 of a magnetic material. A coil spring 15 is mounted around the piston rod 13 between the flange 14 and the end wall 11b.

The flange 14 serves as a presser ring for the coil spring. Like an autotensioner, the cylinder unit 10 of this embodiment is a kind of hydraulic damper. Thus, the piston is formed with small holes (not shown) or minute gap for communication between chambers A and B.

Although the flange 14 is press fit on the piston rod 13, it may be formed integrally with it. If the flange 14 is a separate member from the rod 13, it may be formed of a nonmagnetic and conductive material such as aluminum or copper.

Mounted on the outer side of the end wall 11b is a bobbin 16 around the coil spring 15. A sensor coil 17 for detecting the position of the piston rod 13 is housed in the bobbin 16. A predetermined source voltage is supplied to the coil 17 from a detecting circuit 19 to form a magnetic circuit. Thus, when the flange 14 moves relative to the coil 17 and the spring 15 is compressed or expanded, the inductance of the magnetic circuit and thus the voltage or current of the coil changes. The detector circuit 19 thus detects the position of the flange and thus the piston rod based on the voltage or current of the coil received, which corresponds to the inductance of the magnetic circuit. The coil 17, flange 14 and coil spring 15 thus form a piston rod position detector unit.

If the cylinder unit works as a kind of hydraulic damper, a load is usually applied on the protruding end of the piston rod 13 and thus the spring 15 is compressed to such a position where the load balances with the elasticity of the spring. When the load decreases for some reason, the coil spring 15 expands and the piston rod 13 advances (moves rightwardly in the figure). As the coil spring expands, gaps between coils increase.

To the sensor coil 17, as described above, a predetermined source voltage is supplied. By the magnetic circuit formed by the sensor coil 17, magnetic coupling indicated by an inductance value takes place among the detection coil, spring 15 and flange 14. When the piston rod 13 advances, the flange 14 moves away from the coil 17 and the gaps between the coils of the spring 15 increase. The inductance thus decreases. Conversely, when the load increases and the piston rod retracts, the flange 14 approaches the sensor coil 17 and the coil gaps of the coil spring 15 decrease. The inductance thus increases.

Figure 3:
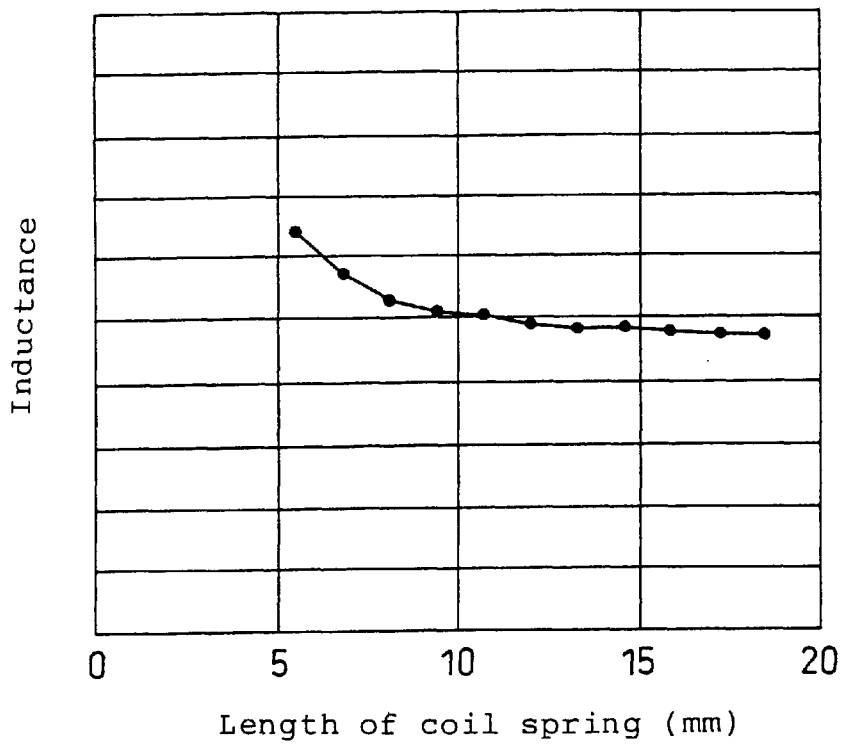
FIG. 3 is a graph showing the inductance property with the position detection unit of the first embodiment.

FIG. 3 shows the relationship between the inductance and the length of the coil spring 15 between the flange 14 and the end wall 11b when the flange was formed of a magnetic material and the coil spring had a wire diameter of 0.55 mm and an outer diameter of 10 mm. The inductance is a combined value of those to the spring 15 and the flange 14.

As seen from the graph, the inductance changes with the length of the coil spring. This changes the resistance of the electric circuit formed by the sensor coil 17 and thus the current or voltage supplied to the coil 17. The detecting circuit 19 detects this change, thereby detecting the change in the position of the piston rod continuously or at a plurality of points.

Figure 4:
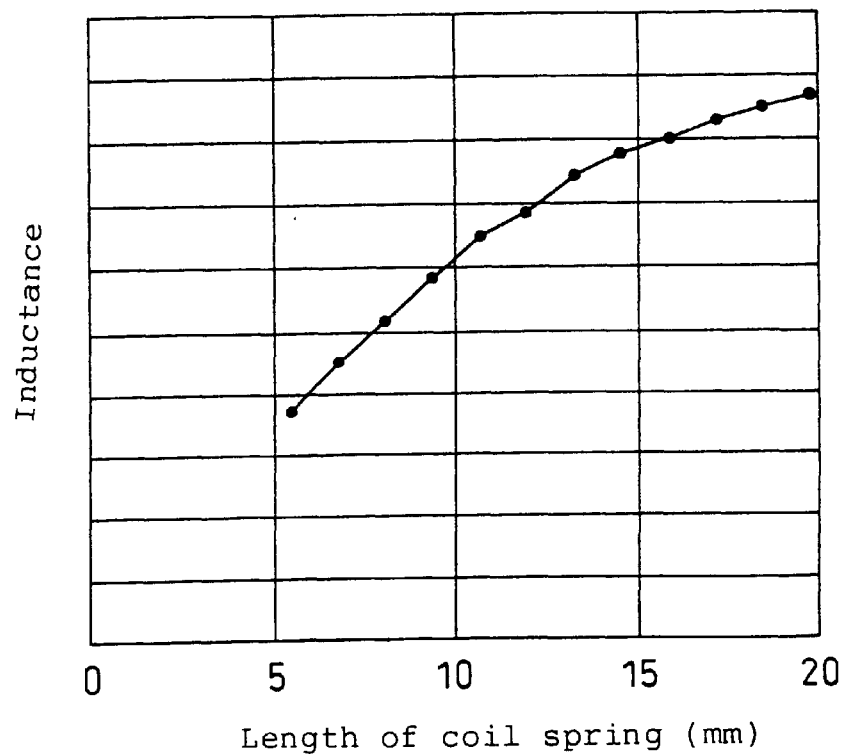
FIG. 4 is a similar graph for a modification of the first embodiment.

FIG. 4 shows the relationship between the inductance and the coil spring length when the flange 14 was formed of a nonmagnetic, conductive material, e.g. aluminum or copper. In this case, as the coil spring is compressed and the flange 14 approaches the coil 17, the inductance decreases as shown. This is the reverse of the embodiment in which the flange 14 is formed of a magnetic material. This is because an eddy current produced in the flange 14 disturbs the flow of magnetic flux of the magnetic circuit formed by the coil 17. In this modified embodiment, however, the inductance changes more than in the first embodiment. That is, the detector circuit of this embodiment is higher in sensitiveness of the detecting circuit.

The second embodiment, not shown, has no coil spring 15. If this cylinder unit 10 is used as a damper, instead of the coil spring 15, a coil spring may be mounted in the chamber A to pull or push the piston 12. If the cylinder unit 10 is used as an ordinary cylinder for transforming a hydraulic power to a pressing force through the piston rod 13, hydraulic fluid is supplied into the chambers A and B through external pipes. The flange 14 is formed of a nonmagnetic, conductive material such as aluminum or copper.

The piston rod position detector unit of this embodiment comprises the coil 17 and the flange 14 and operates in the same way as the detector of the first embodiment. Although the sensitiveness of the detector is slightly lower in the second embodiment because of omission of a coil spring, this will pose practically no problem.

Figure 2:
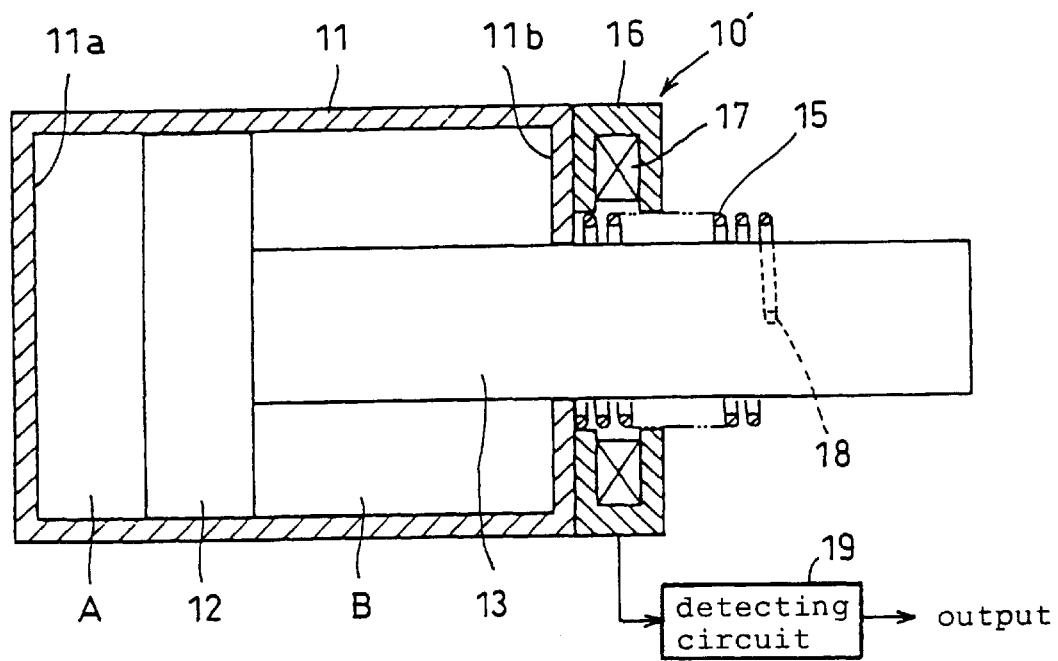
FIG. 2 is a sectional view of a cylinder unit with a position dection unit of a third embodiment.

FIG. 2 shows a third embodiment in which the flange 14 is omitted and one end of the coil spring 15 is engaged in a hole 18 formed in the piston rod 13.

The piston rod position detector unit of this embodiment operates in the same way as the detector of the first embodiment. Although the sensitiveness of the detector is slightly lower in this embodiment because of omission of a flange, this will pose practically no problem.

Figure 5:
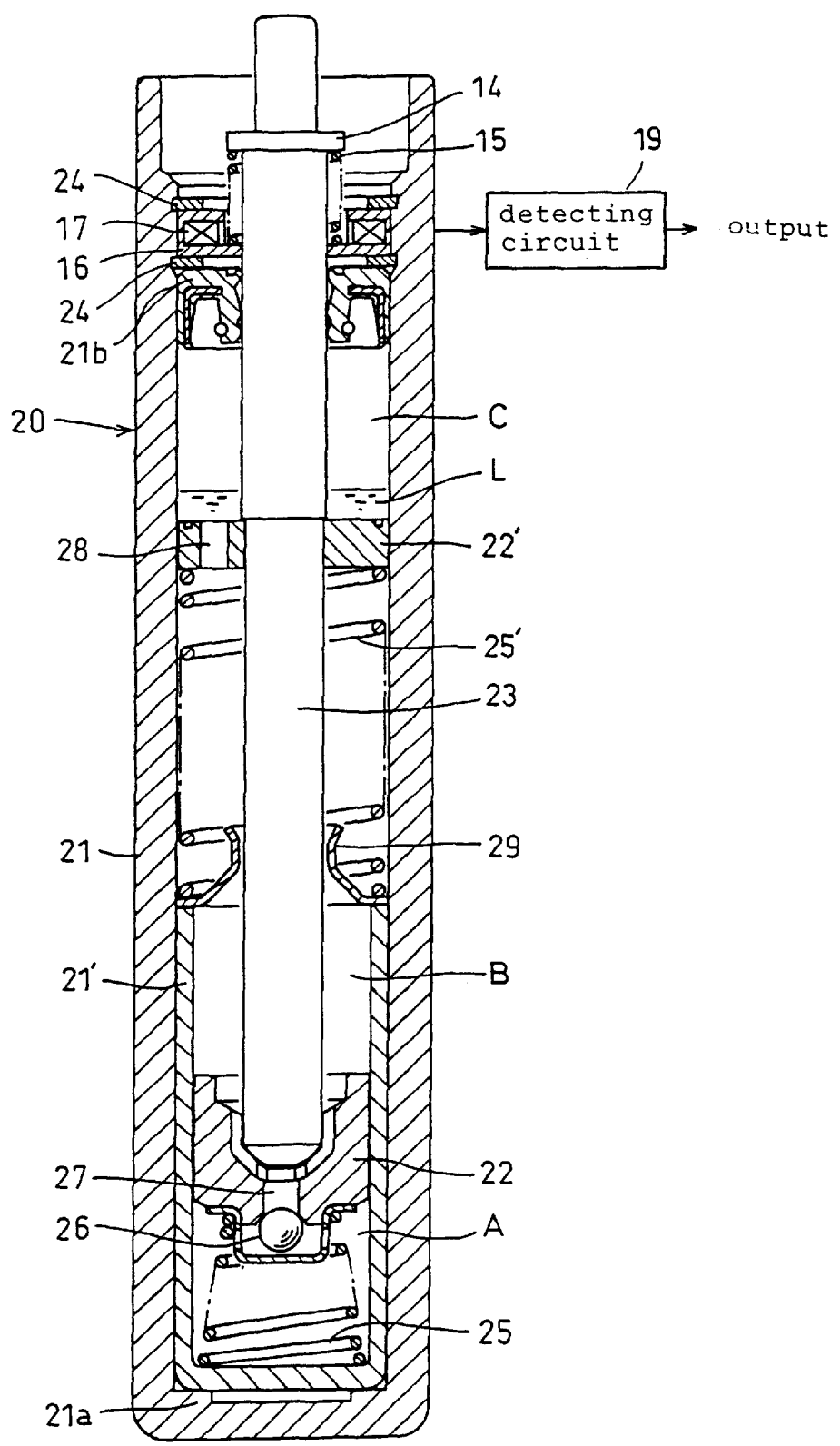
FIG. 5 is a sectional view of an autotensioner provided with the position dection unit of the first embodiment, according to a fourth embodiment.

FIG. 5 shows a fourth embodiment, which is an autotensioner having a position detector unit of any of the first to third embodiments. Although the autotensioner itself is conventional, its structure and operation will be briefly described below.

The autotensioner 20 includes a cylinder 21 having a closed bottom 21a and an open top and a sleeve 21' fixedly received in the cylinder 21 at its bottom, and a piston 22 slidably received in the sleeve 21' and partitioning the interior of the cylinder into a lower pressure chamber A and an upper reservoir chamber B. The latter has its top end closed by an oil seal 21b retained in position by snap rings 24 received in grooves formed in the inner wall of the cylinder 21.

A pushrod (or piston rod) 23 has its bottom end received in a hole formed in the top face of the piston 22 and slidably extends through the oil seal 21b. Its top end protrudes from the cylinder 21. The piston 22 is biased upwardly by a spring 25 mounted in the pressure chamber A so as to be movable together with the pushrod 23. The chambers A and B communicate with each other through a passage 27 formed in the piston 22. A ball 26 retained by a retainer on the other end of the piston 22 forms a check valve.

The pushrod 23 carries a guide flange 22' slidable along the inner wall of the cylinder 21. A pressure adjusting spring 25' is mounted around the pushrod 23 between the guide flange 22' and the top end of the sleeve 21' to bias the pushrod upwardly. The flange 22' is formed with a hole 28 through which hydraulic fluid in the reservoir B flows. Without the hole 28, the flange 22' and thus the pushrod cannot move. Hydraulic oil L is filled so that an air layer C is present between the top of the hydraulic oil and the oil seal 21b (i.e., as illustrated in FIG. 5, the autotensioner 20 utilizes both a gas C and a liquid L). A separator 29 is provided to prevent air above the hydraulic oil from invading into the pressure chamber B.

Between the upper and lower snap rings 24, the coil 17 and the bobbin 16 of the detector unit of any of the first to third embodiments are provided. The bobbin 16 has a bottom wall having its radially inner periphery in slide contact with the pushrod 23. A coil spring 15 is mounted around the pushrod and supported between the bottom wall of the bobbin 16 and the flange 14 fixed to the pushrod near its top end. But instead, the spring 15 may be supported between the flange 14 and the lower snap ring 24 by reducing the inner diameter of the lower snap ring 24 and increasing the inner diameter of the lower wall of the bobbin.

The autotensioner 20, as mounted in the belt transmission system of FIG. 12, operates as follows. When the tension in the timing belt 4 increases, the pushrod 23 and the piston 22 are pushed down, so that the pressure in the pressure chamber A rises. The passage 27 is thus closed instantly by the ball 26 of the check valve.

A narrow gap is formed in the inner surface of the sleeve 21' or the radially outer surface of the piston 22. Thus, when the pressure in the pressure chamber A rises, hydraulic fluid in the pressure chamber gradually leaks through the narrow gap into the reservoir chamber B. The volume of the pressure chamber thus decreases and the pushrod 23 descends slowly until the downward pressure on the pushrod balances with the force of the spring 25'. In other words the pushing force applied to the pushrod is damped by the damping action of the autotensioner.

When the belt 4 slackens, the pushrod is pushed up by the spring 25' and the piston 22 is pushed up by the spring 25. Thus, the pressure in the pressure chamber A instantly drops below the pressure in the reservoir chamber B. The check valve thus instantly opens the passage 27, allowing hydraulic fluid in the chamber B to flow smoothly into the chamber A as the pushrod rises. The pushrod can thus rise quickly to absorb the slack of the belt and keep belt tension constant.

The timing belt tends to gradually stretch due to aging. The pushrod 23 absorbs the stretch of the belt by protruding beyond its initial stroke. With a prolonged use of the belt, the pushrod advances more and more.

Although the stroke of the pushrod 23 of the autotensioner 20 is determined taking these factors into consideration, due to increased travel distance of the car between routine maintenances of the belt 4 or due to sudden abnormal elongation of the belt, the pushrod 23 may protrude to its stroke limit. The stroke limit of the pushrod 23 is at a point where the guide flange 22' abuts the oil seal 21b because once the flange abuts the oil seal, the spring 25' cannot push the pushrod 23 outwardly any further.

The detector of the autotensioner 20 can detect the position of the pushrod continuously or at a plurality of points until the stroke limit is reached because of the provision of the coil 17, the coil spring 15, and the flange 14.

In the embodiment, since the position detecting mechanism has both of the flange 14 and the coil spring 15, if a magnetic material is used as the material of the flange 14, detection by the inductance properties (as shown in FIG. 3) in the first embodiment is possible by the detecting circuit 19. As a modified embodiment, if aluminum or copper material is used for the flange 14, detection based on the inductance as shown in FIG. 4 can be made.

In the position detecting mechanism of the second embodiment, the coil spring 15 is omitted, and as the material of the flange 14, aluminum or copper is used. As described above, although detection sensitivity is inferior to the inductance properties shown in FIG. 4, it can be used as a means for detecting the movement of the pushrod 23 of the autotensioner 20. Also, with the position detecting mechanism of the third embodiment, since position detection can be made based on change of inductance due to expansion and shrinkage of the coil spring 15 while omitting the flange 14, this detecting mechanism can also be applied.

By applying any of the position detecting mechanisms of the first to third embodiments as described above to detect the position of the pushrod 23 in a multiple-point manner or as a continuously changing position, as the stroke of the pushrod 23 changes gradually with a long-term use due to such factors as change of the timing belt with age, the detection signal from the detecting circuit 19 also changes according to the amount of change from the initial setting value of the moving stroke.

Thus, in the circuit for comparing with a plurality of reference values corresponding to the respective stages of the change of the moving stroke based on the output signal, it is possible to output warning signals such as "caution", "dangerous", "limit", or stop signals based on comparison of the above signals. Thus, measures can be taken by performing the maintenance earlier.

Figure 6:
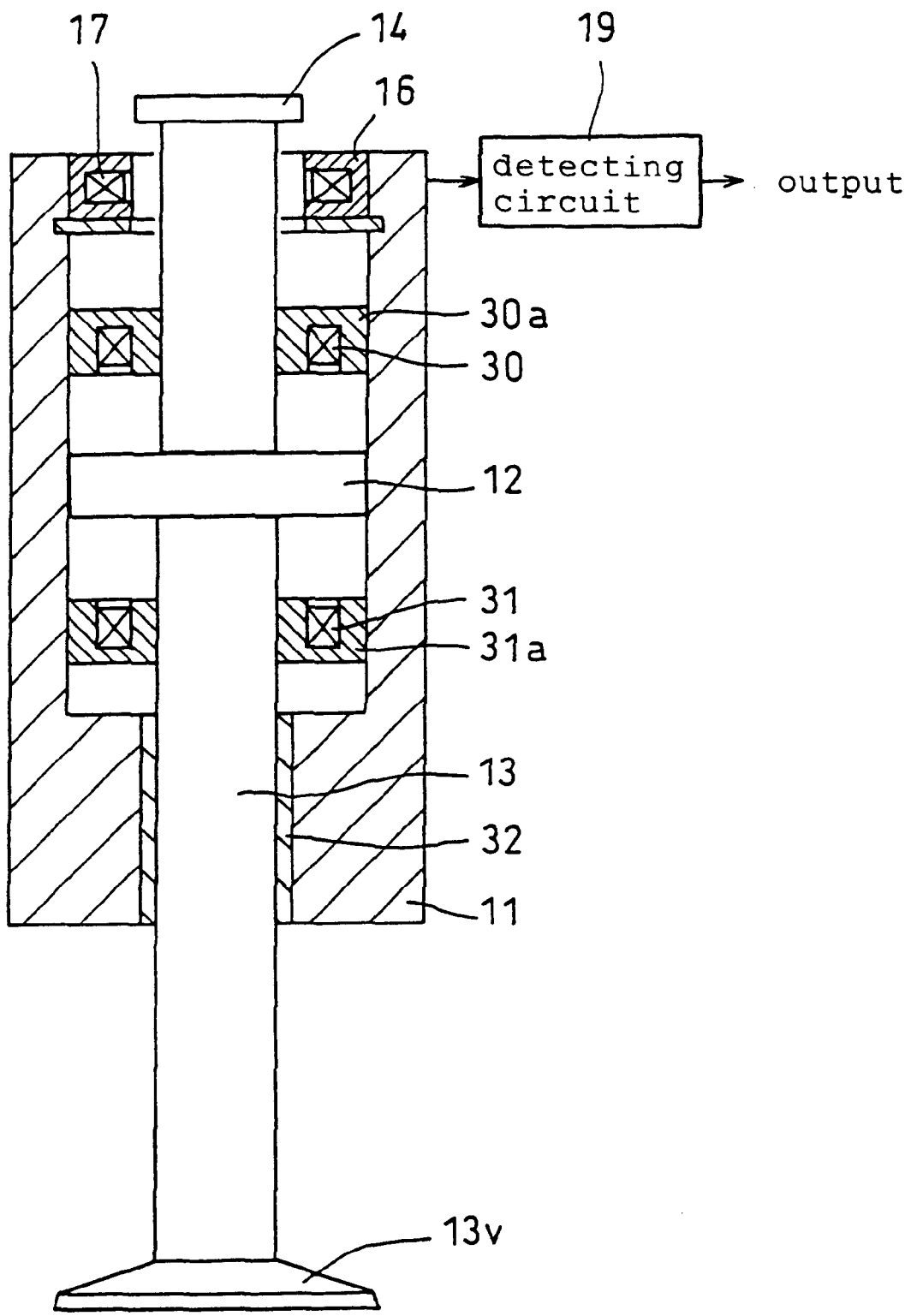
FIG. 6 is a sectional view of an electromagnetic valve with the position detection unit, according to a fifth embodiment.

FIG. 6 shows a fifth embodiment, in which the position detector of any of the first to third embodiments is used in an electromagnetic valve. The detector shown includes the flange 14 and the detection coil 17 but not the coil spring. The valve shown comprises an open-topped, bottom-closed cylinder 11 and a piston 12 of a magnetic material slidably received in the cylinder. Piston rods 13 are connected to both sides of the piston 12. But instead, a single piston may extend through the piston. The free ends of the piston rods 13 protrude from both ends of the cylinder.

In the cylinder, two electromagnetic coils 30, 31 are mounted so as to surround the respective piston rods on both sides of the piston 12 in members 30a, 31a of a magnetic material. By activating the coil 30 or 31, the piston 12 is attracted toward the activated one of the coils. Outside the coil 30, the detection coil 17 housed in the bobbin 16 is mounted in the cylinder 11. The flange 14, which is of a conductive material, is mounted on the top end of the upper piston rod 13.

As in the previous embodiments, the detector circuit 19 receives the signal from the coil 17 and detects the position of the flange. The lower piston rod 13 is slidably guided by a bearing bushing 32 mounted in the bottom end wall of the cylinder 11 and carries at its bottom protruding end a valve body 13V adapted to be moved into and out of contact with an unillustrated valve seat of an electromagnetic valve to close and open the valve.

The electromagnetic valve is used as a valve for feeding fluid such as fuel gas into e.g. an internal combustion engine. Since it is possible to arbitrarily set the amount of opening of the valve, it is possible to set optimum burning conditions according to the driving state. If the amount of opening of the valve changes due to a secular change, such a change is detected by the position detecting mechanism in the same manner as in the other embodiments.

For opening and closing of the valve, when one of the electromagnetic coils 30, 31 is activated, the electromagnet containing the activated electromagnetic coil attracts the piston 12 to move the piston rod 13 in an upward or a downward direction to open or close the electromagnetic valve body. The opening of the valve is adjusted by adjusting the current intensity supplied to the electromagnetic coils 30, 31. In this embodiment, too, detection of the moving amount by the detection coil is made in a similar manner to other embodiments. It is a matter of course that the change is detected continuously or in a multiple-point manner.

In this embodiment, the flange 14 is made of a conductive material. But if it is made of a magnetic material, a coil spring should be used. A nonmagnetic flange 14 and a coil spring may be combined as already described. Also, as in the third embodiment, only the coil spring 15 is used with the flange 14 omitted.

Figure 7:
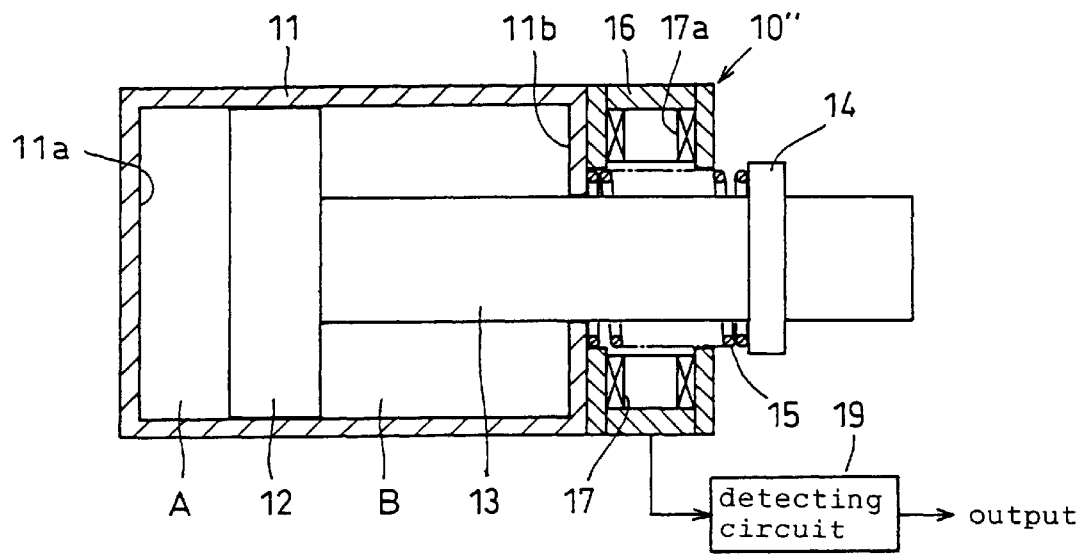
FIG. 7 is a sectional view of a cylinder unit with the position detection, according to a sixth embodiment.
Figure 8:
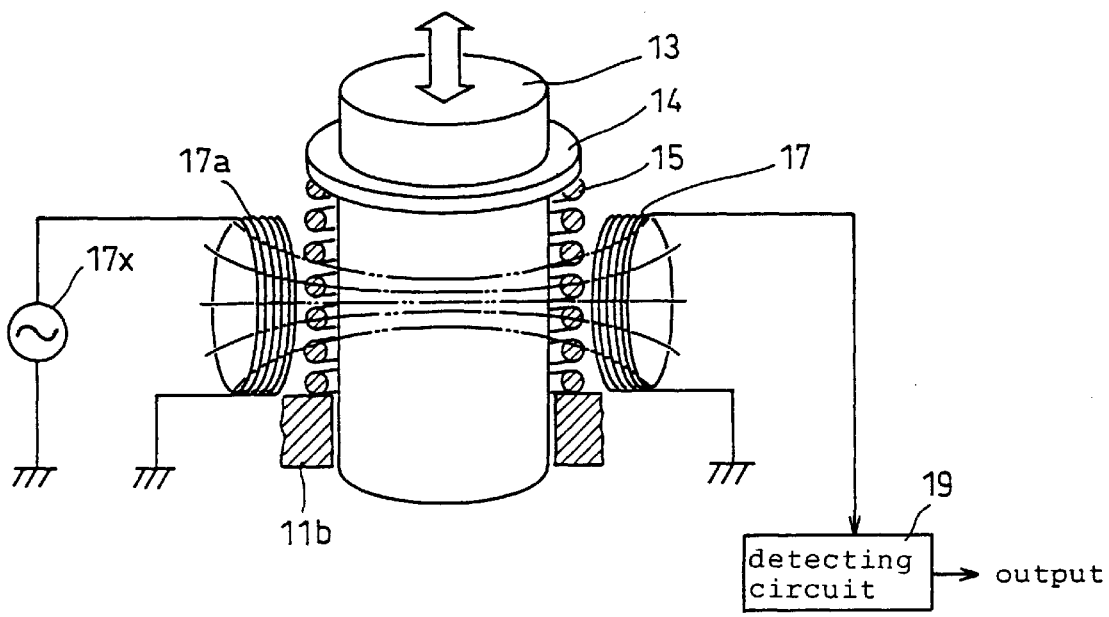
FIG. 8 is a perspective view of the position detection unit of FIG. 7.

FIG. 7 shows a sectional view of a sixth embodiment. This embodiment is provided with a detecting mechanism in a cylinder unit 10" having a flange 14 on the piston rod 13 as in the first embodiment of FIG. 1. This position detecting mechanism comprises a coil spring 15 provided between an end wall 11b and the flange 14, and an exciting coil 17a and a detecting coil 17 provided opposite to each other with the coil spring 15 sandwiched between them. This position detecting mechanism is shown in FIG. 8 in perspective. The flange 14 serves as a presser ring in this embodiment, too.

As shown in FIG. 8, the exciting coil 17a and the detecting coil 17 are provided opposite to each other so that the direction of magnetic lines passing both coils will be normal to the axial direction of the piston rod 13. In the illustrated example, the exciting coil 17a is provided separately from the detecting coil 17. When the magnetic flux (or lines) produced by causing a high-frequency signal to flow from a signal generator 17x, e.g. a signal current of 1–50 KHz passes through the piston rod 13 and the coil spring 15 wound around its outer periphery and reaches the detecting coil 17, a small current induced by electromagnetic induction by the magnetic flux is detected by the detecting coil 17, and the signal of the small current is amplified and detected by the detecting circuit 19.

In this position detecting mechanism, when the piston rod 13 protrudes and the position changes, the coil spring 15 expands and the gaps between coils increase, so that the inductance of the detecting coil 17 decreases when it is transmitted from the exciting coil 17a to the detecting coil 17. In other words, with the expansion and shrinkage of the coil spring 15, the sectional area of the magnetic material of the coil spring changes, thus changing the inductance of the detecting coil 17. Thus, the current or voltage signal at the detecting coil 17 changes, so that by detecting the change by detecting circuit 19, it is possible to detect the change in position of the piston rod 13.

Figure 9:
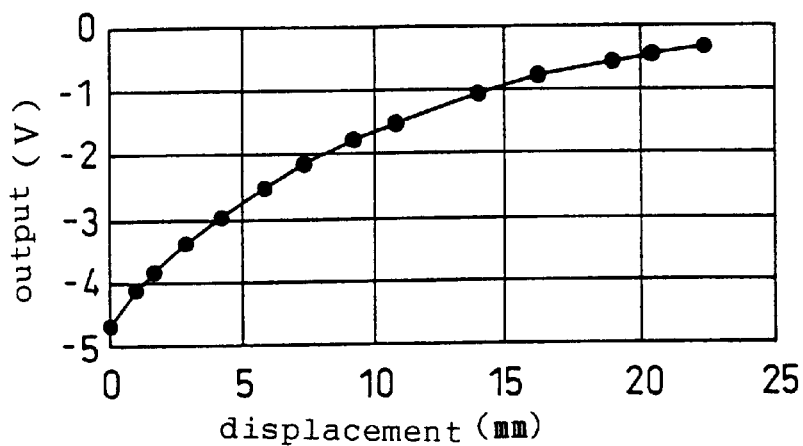
FIG. 9 is a graph showing the measuring data with the position detection unit of FIG. 7.

FIG. 9 shows the change in the output voltage measured by the position detecting mechanism. The coil spring 15 used in this measurement had a 0.6 mm wire diameter and a coil winding diameter of 10 mm. The abscissa indicates the displacement of the rod and the obscissa indicates the output voltage. For the position change of the piston rod 13, the change in the output voltage is large. Thus, it is apparent that a good sensitivity was obtained.

In this embodiment, the exciting coil 17a and the detecting coil 17 are formed separately. But both coils may be formed integrally. In such a case, as with the detecting coil of the first embodiment, an exciting current is fed to the detecting coil itself. The magnetic flux produced by the current is influenced by the expansion and shrinkage of the spring coil 15, so that the inductance changes. Thus, since its detecting signal is detected by the detecting circuit 19, the position change can be measured.

Figure 10:
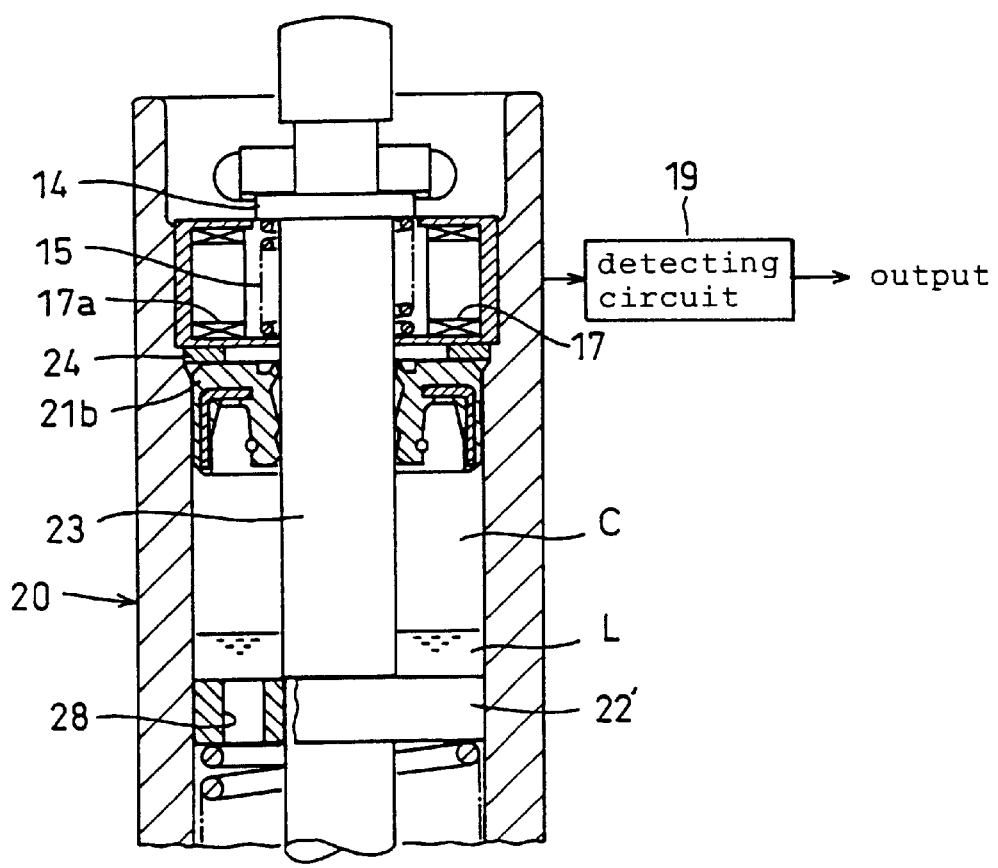
FIG. 10 is a sectional view of an autotensioner with the position detection unit of FIG. 7, according to a seventh embodiment.

FIG. 10 shows a sectional view of a seventh embodiment. In this embodiment, the position detecting mechanism of the sixth embodiment of FIGS. 7 and 8 is combined with the autotensioner of FIG. 5. Since the structure of the autotensioner has already been described, a detailed description of this embodiment is omitted.

Figure 11:
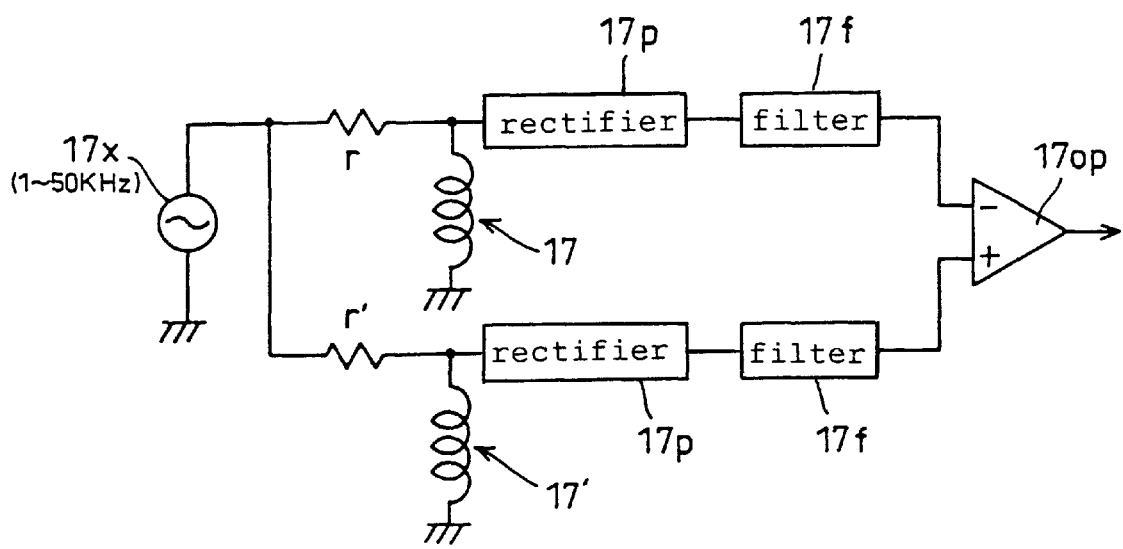
FIG. 11 is a circuit diagram of the position detection circuit with a temperature compensating coil.

FIG. 11 shows an electric circuit for temperature compensation. In this modification, the coil 17 serves both as an exciting coil and a detecting coil. For temperature compensation, another coil of the same type as the detecting coil 17 is provided parallel to a signal generator 17x as a temperature compensating coil 17'. The detecting signal by the temperature compensating coil 17' is set (by adjusting the resistor r') so that the influence by the temperature change will be small. By using this as a reference, it is sent through a rectifier 17p and a filter 17f. As the measuring line, the signal sent through a rectifier 17p and a filter 17f is compensated by a differential amplifier (operational amplifier) 17op by an offset amount due to temperature change by the temperature-compensating-line signal for accurate position detection.

Figure 14:
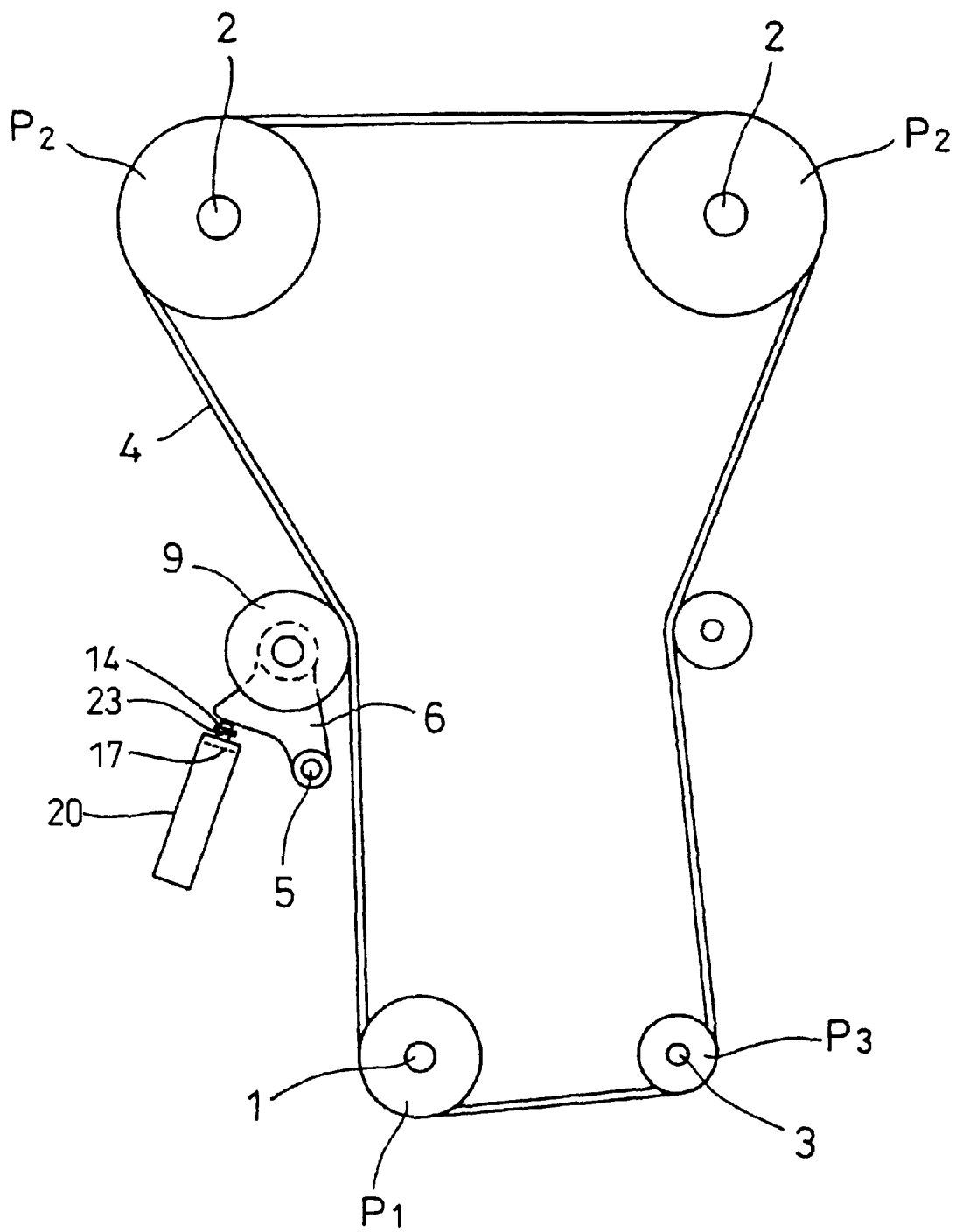
FIG. 14 is a schematic view of a belt transmission device embodying the present invention.

FIG. 14 is a schematic view of a belt transmission device in which the position detecting device and the autotensioner of the present invention are mounted. Since the belt transmission device is the same as that shown in FIG. 12, like numerals are affixed to like members and the description is omitted. In this embodiment, at an open end of a cylinder of the autotensioner 20 from which a pushrod supported in the cylinder so as to advance and retract protrudes, a detecting coil 17 is provided and a flange portion is provided on the pushrod. These form a detecting means for detecting a change in the axial position of the pushrod continuously or in a multiple-point manner. For its details, description has already been made. Also, the autotensioner itself has already been described.

Figure 12:
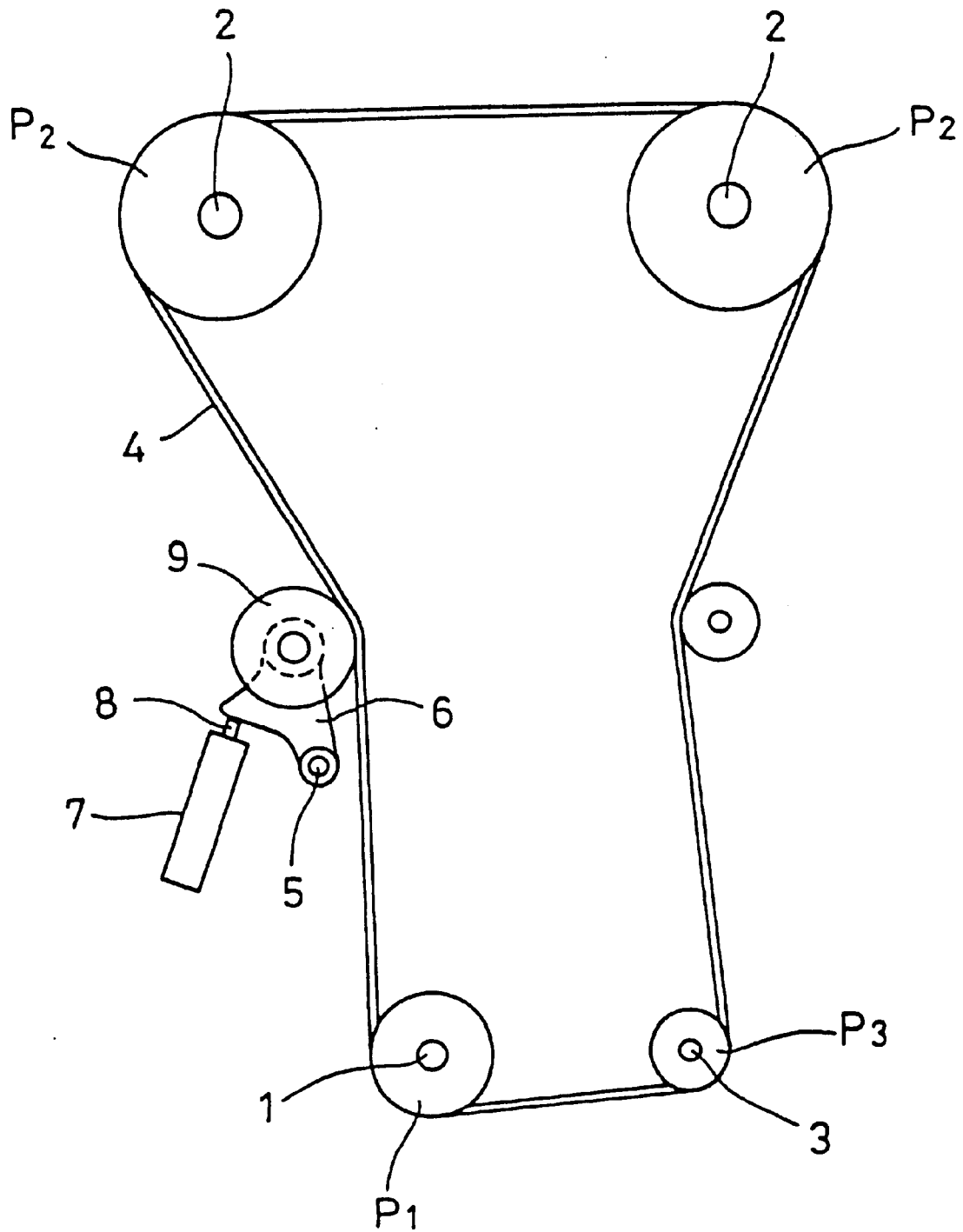
FIG. 12 is a front view of a conventional belt transmission device for driving camshafts.
Figure 13:
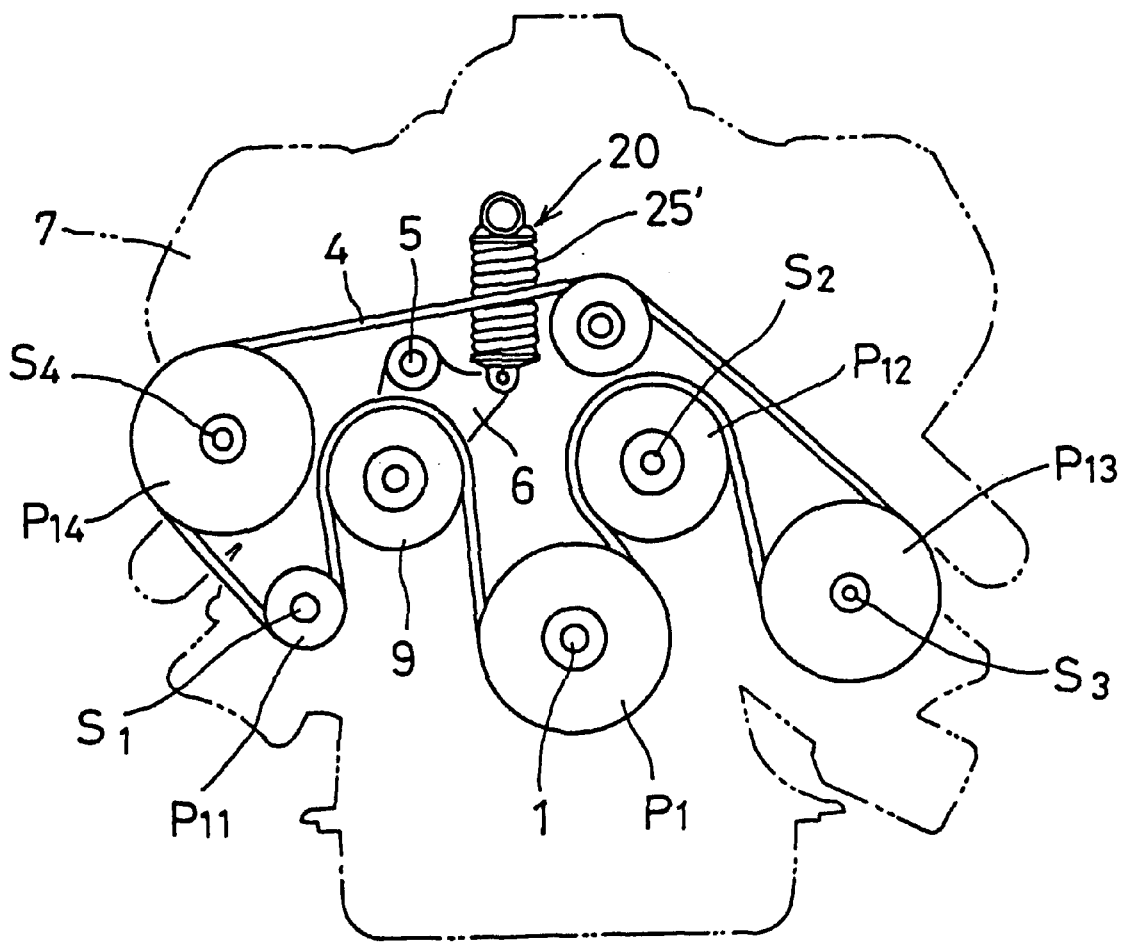
FIG. 13 is a view showing another type of a belt transmission device.

FIG. 13 shows a belt transmission device that is different in type from that of FIG. 12. The autotensioner and its position detecting means applied to the belt transmission device of the first type are equally applicable to the belt transmission device of this type, too. The one shown in the figure shows a serpentine type belt transmission device. In this device, a belt 4 comprising a single V-belt is trained between a pulley P1 mounted to a crankshaft 1, a pulley P11 mounted to a rotary shaft S1 of an alternator, a pulley P12 mounted to a rotary shaft S2 of a fan of a radiator, a pulley P13 mounted to a rotary shaft S3 of an air compressor, and a pulley P14 mounted to a rotary shaft S4 of a motor for power steering, so that by the rotation of the crankshaft 1, these various engine accessories including the alternator are adapted to be driven simultaneously.

A tension pulley 9 for adjusting the tension of the belt 4 is rotatably supported at one end of a pulley arm 6. On the other hand, the pulley arm 6 is supported so as to be pivotable about a support shaft 5 mounted to an engine block. To the other end of the pulley arm 6, a gas/liquid two-phase autotensioner 20 is connected. Although the autotensioner shown is of a type in which the spring is mounted outside, it will be needless to say that it may be of an inside-mount type.

Figure 15:
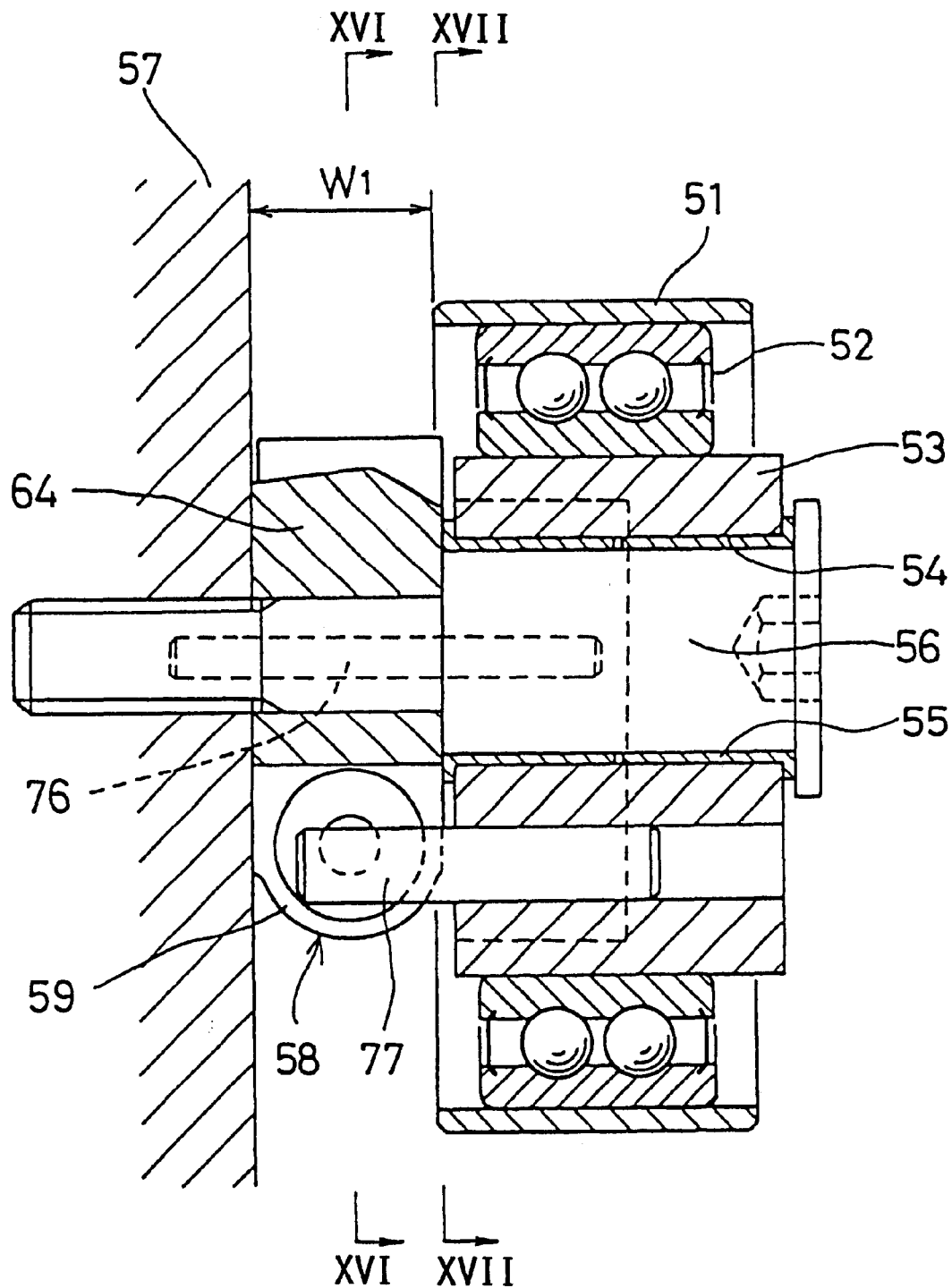
FIG. 15 is a sectional view of a belt tension adjustor of a first embodiment.
Figure 16:
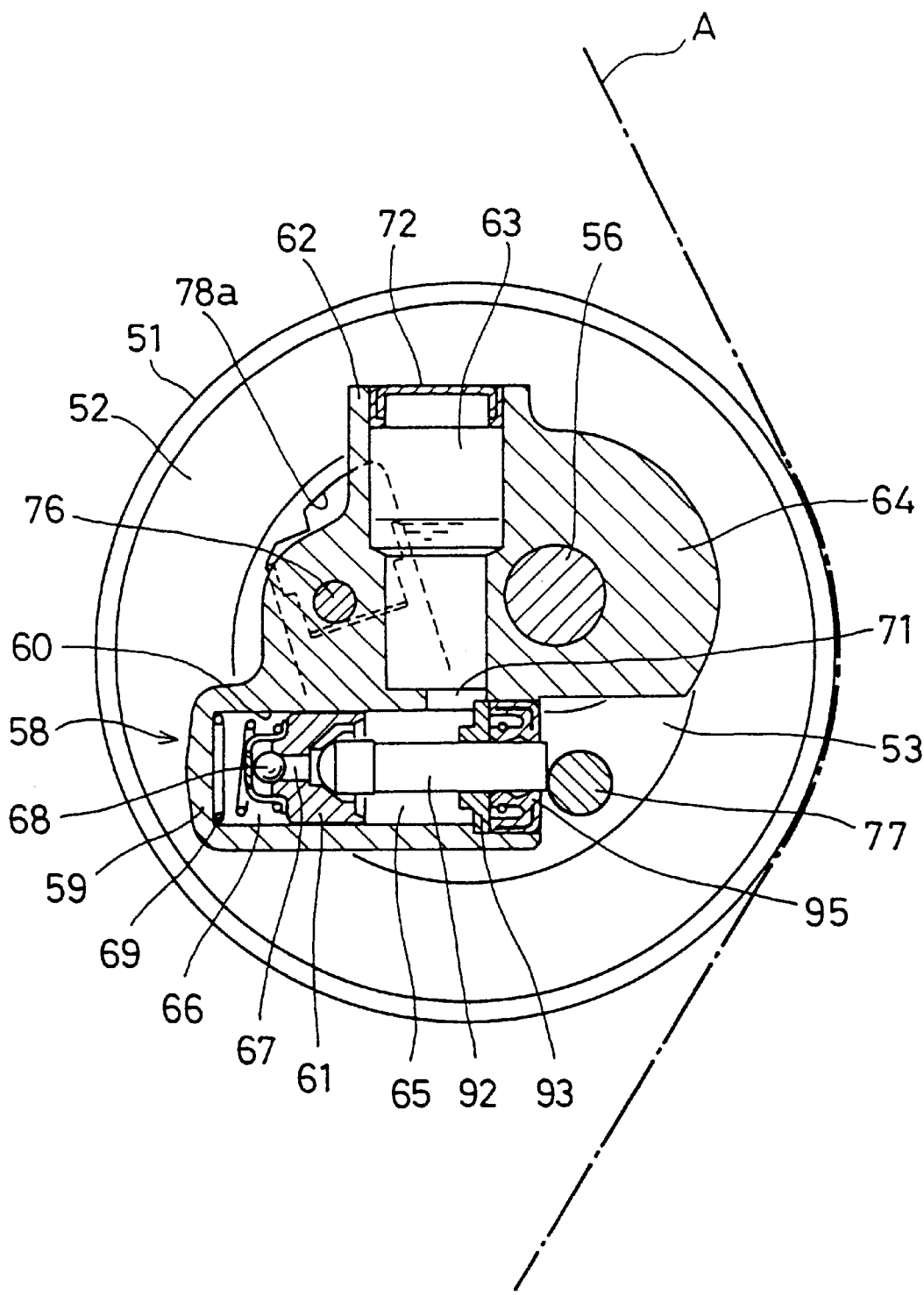
FIGS. 16 and 17 are partially cutaway side views along lines XVI—XVI and XVII—XVII of FIG. 15, respectively.

A belt tension adjustor of a first embodiment is shown in FIGS. 15–18. It includes an eccentric ring 53 having an eccentric hole 54. A fixing bolt 56 extends through the eccentric hole 54 and tightened to an engine block 57 to pivotably support the eccentric ring 53 through a slide bearing 55. A tension pulley 51 is rotatably mounted around the eccentric ring 53 through a rolling bearing 52. A hydraulic damper 58 is mounted in the gap defined between the eccentric ring 53 and the engine block 57. As shown in FIG. 16, the damper 58 is arranged completely within the outer periphery of the tension pulley 51.

The damper 58 includes, as shown in FIG. 16, an integral block 64 comprising a damper cylinder 59 formed with a cylindrical bore 60 and a protrusion 62 at one side. The cylindrical bore 60 is partitioned into a pressure chamber 66 and a main reservoir 65 by a plunger 61 slidably received in the bore 60. In the protrusion 62, a sub-reservoir 63 and a fixing bolt 56 are provided. The plunger 61 has a passage 67 through which the main reservoir 65 and the pressure chamber 66 communicate with each other. A check valve 68 provided at the lefthand end of the passage 67 opens and closes the passage. The plunger 61 is biased rightwardly by a coil spring 69 mounted in the pressure chamber 66 in a compressed state.

A rod 92 has one end thereof received in a recess formed in the righthand end of the plunger 61 and is loosely supported by a wear ring 93 so as to be axially movable. The other end of the rod 92 extends through an oil seal 95 closing the bore 60 and protrudes from the damper cylinder 59. A sub-reservoir 63 is formed in the protrusion 62. It extends perpendicular to the bore 60 and communicates with the main reservoir 65 through a passage 71. Its open end is closed by a rubber cap 72. The tension adjustor is mounted with the sub-reservoir 63 located over the main reservoir 65. In this state, hydraulic oil fills the main reservoir 65 and the pressure chamber 66 and a lower part of the sub-reservoir 63 with its upper portion filled with air.

The hydraulic damper 58 is fixed to the engine block 57 by the bolt 56 extending therethrough (FIG. 18) with its rod 92 abutting a pin 77 on the eccentric ring 53 (FIG. 16). Since two reservoirs are provided perpendicular to each other, it is possible to arrange the hydraulic damper 58 within the circumference of the pulley 51 as shown and keep small the gap W1 between the tension pulley 51 and the engine block 57 (FIG. 15).

Figure 17:
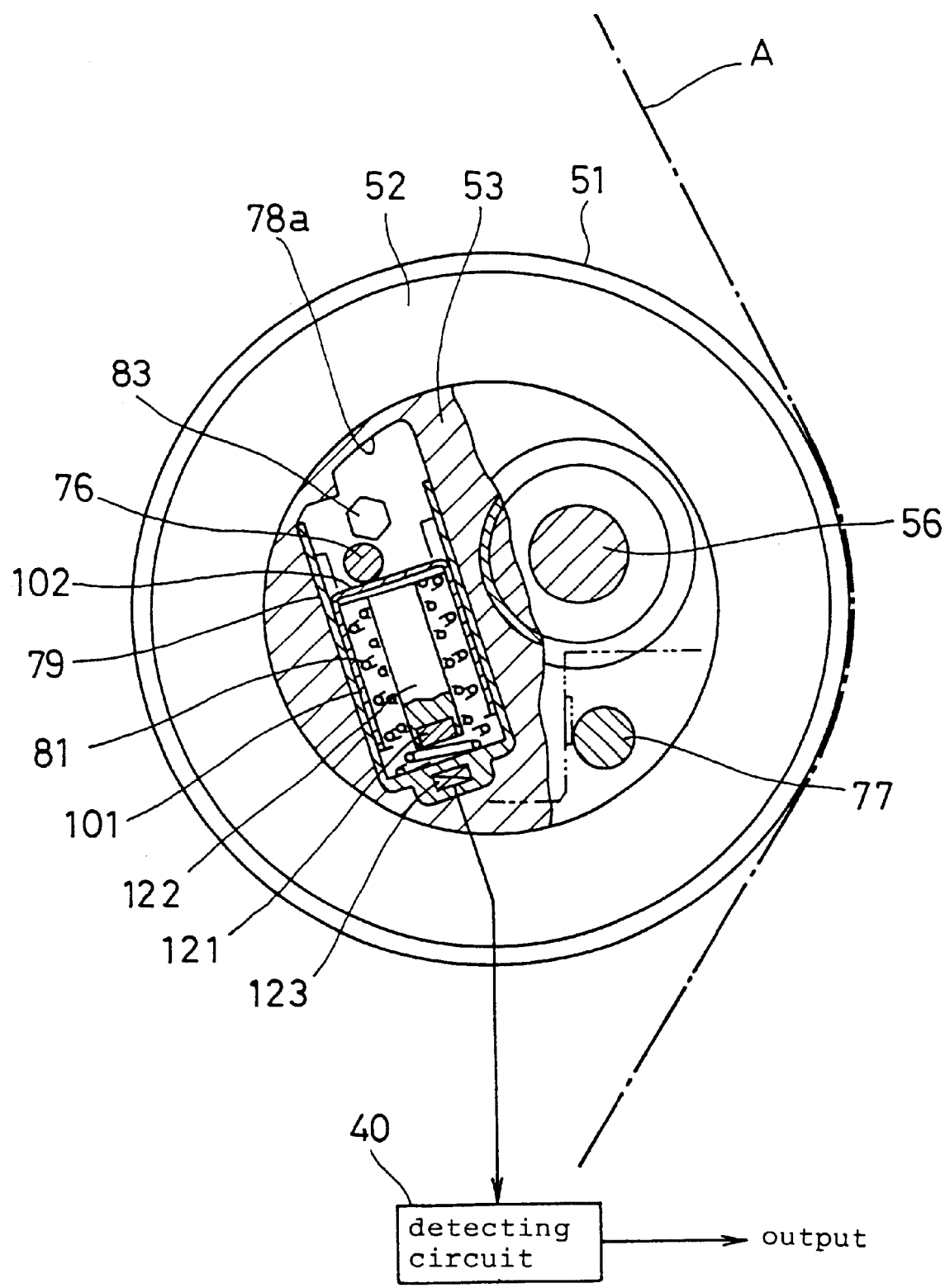

In its side facing the engine block, the eccentric ring 53 for supporting the tension pulley 51 is formed with a recess 78a in which is loosely received a pin 76 (FIG. 17), which extends through the protrusion 62 of the damper 58. A cylindrical slide sleeve 101 of synthetic resin having a closed bottom is received in the recess 78a. A tension adjusting spring 81 is received in the sleeve 101 in a compressed state with one end thereof supported on the bottom of the sleeve 101 and the other end on the pin 76 through a slide cap 102 slidably received in the sleeve 101. As shown in FIG. 17, the spring 81 biases the eccentric ring 53 to pivot it counterclockwise (in the figures) about the bolt 56, thereby pressing the pulley 51 against the belt A. Instead of the double-coil spring 81 shown in FIG. 17, a single-coil spring may be used.

In order to set the tension adjustor of this embodiment in an operable state such as shown in FIG. 16 or 17, the tension adjustor is mounted on the engine block 57, the eccentric ring 53 is pivoted clockwise with a hexagonal wrench engaged in a hexagonal hole 83 formed in the eccentric ring 53 while compressing the spring 81 and pushing in the plunger 61, the belt A is engaged on the tension pulley 51, and the wrench is disengaged to allow the eccentric ring to pivot counterclockwise to press the pulley 51 against the belt.

Figure 18:
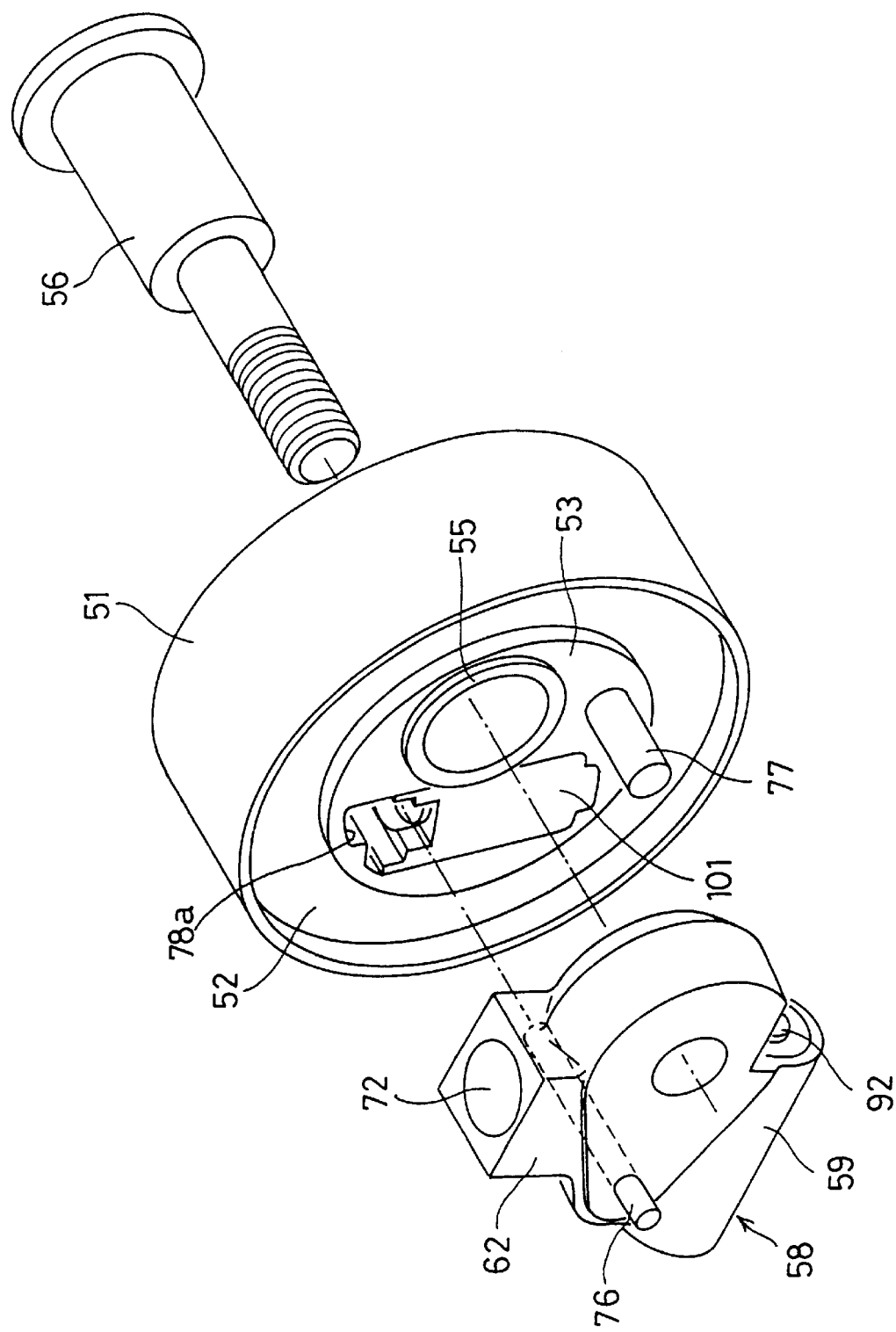
FIG. 18 is an exploded perspective view of the first embodiment.

FIG. 18 will be helpful for understanding the relation between the tension pulley 51 and the hydraulic damper 58.

The belt tension adjustor of this embodiment is provided with a detector for detecting the position or displacement of the pulley 51. As shown in FIG. 17, the detector includes a detection rod 122 inserted in the spring 81 and having a flange at the bottom of the sleeve 101. Thus, together with the cap 102, the rod 122 is axially movable in and relative to the sleeve 101 toward and away from the bottom of the sleeve 101 as the spring 81 is compressed or expands. A cylindrical, axially magnetized magnet 121 is bonded or otherwise fixed to the other end of the rod 122.

The tension adjusting spring 81 has one end abutting the flange of the rod 122 and the other end on the bottom of the sleeve 101. A magnetic sensor 123 is embedded in the bottom of the slide sleeve 101. The sensor 123 may be a Hall sensor. It produces a signal indicative of the distance between the sensor and the magnet 121 and thus the position of the pulley 51.

The operation of the belt tension adjustor of the first embodiment will be described. When the tension in the belt A increases in the state of FIG. 16, the pin 77 urges the protruding end of the rod 92 and the plunger 61. This increases the pressure in the pressure chamber 66. Hydraulic oil in the pressure chamber 66 thus leaks through a small gap formed between the plunger 61 and the inner wall of the bore 60 into the main reservoir 65 to dampen the movement of the plunger, and part of the oil flows through the passage 71 into the sub-reservoir 63. The tension pulley 51 and the eccentric ring 53 are thus allowed to slowly pivot clockwise about the bolt 56 while pushing in the rod 92 and the plunger 61 until the belt tension balances with the force of the tension adjusting spring 81.

On the other hand, when the tension in the belt A decreases, the tension adjustor spring 81 quickly pivots the pulley 51 and the eccentric ring 53 counterclockwise. The pin 77 thus moves rightwardly in FIG. 16. This causes the pressure in the pressure chamber 66 to drop below the pressure in the reservoir 65, so that the check valve 68 opens the passage 67. Thus, the plunger 61 and the rod 92 are quickly moved rightwardly by the spring 69, following the movement of the pin 77, because hydraulic oil in the main reservoir 65 and hydraulic oil in the sub-reservoir 63 smoothly flow into the pressure chamber 66 through the passage 67 and into the main reservoir 65 through the passage 71, respectively.

Figure 19:
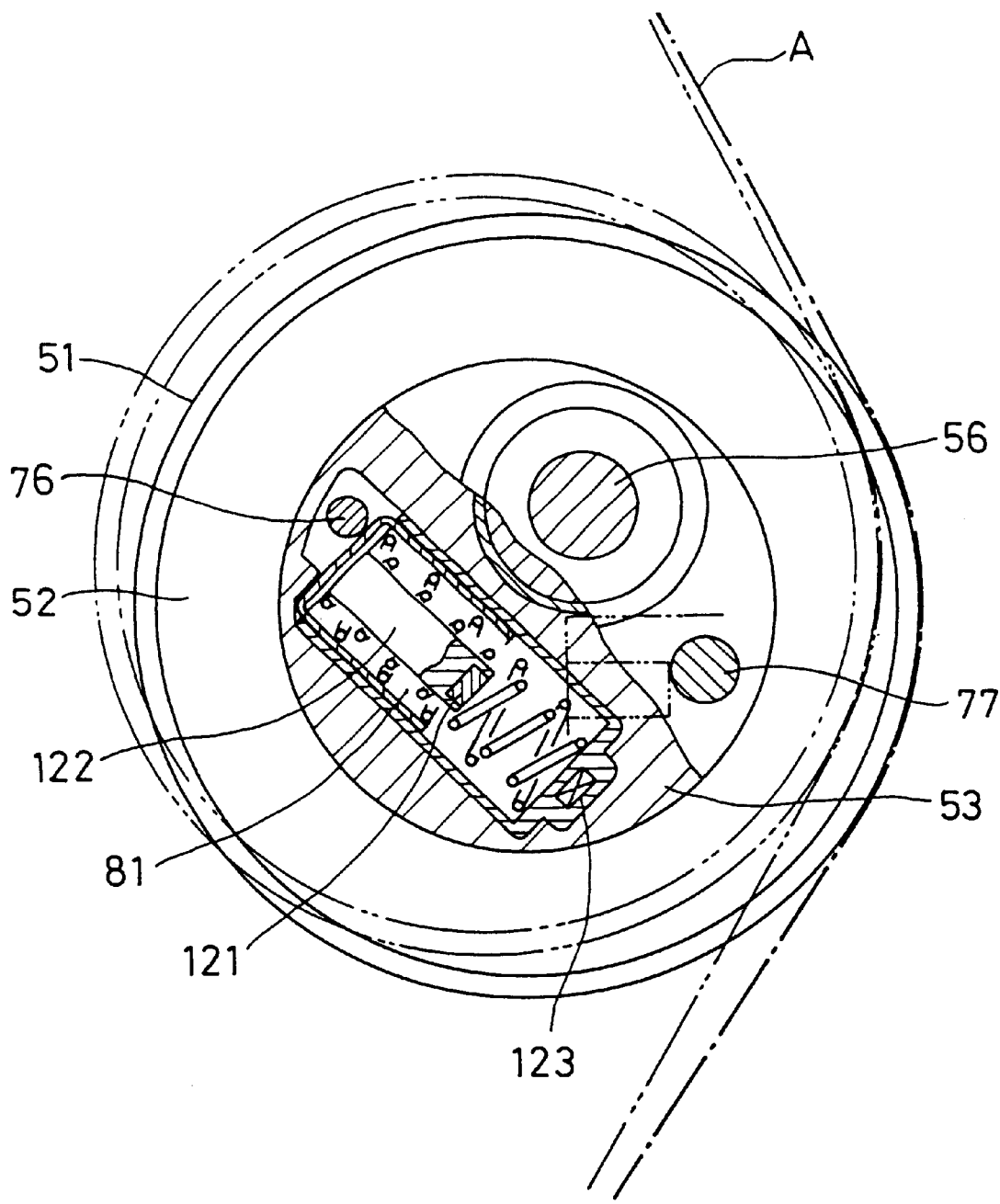
FIGS. 19 and 20 are views showing different operational states of the first embodiment.

The detecting unit includes a detecting circuit 40, which, based on the signal from the sensor 123, detects the distance between the sensor 123 and the magnet 121 and thus the position of the pulley 51. As will be apparent from FIGS. 16, 17 and 19, the detector unit is arranged such that when the tension in the belt increases and the pulley 51 pivots clockwise (moves leftwardly), the magnet 121 moves closer to the sensor 123, and thus the magnetic flux passing the sensor increases. Conversely, as the tension in the belt decreases and the pulley pivots counterclockwise to the limit (as shown by solid line in FIG. 19), the magnetic flux picked up by the sensor will become minimum. Thus, by detecting the intensity of magnetic flux passing through the sensor 123, it is possible to detect the distance between the sensor 123 and the magnet 121 and thus the position of the pulley 51. If the sensor 123 is a Hall sensor having an analog-output, the position of the rod 92 can be detected continuously as a function of the distance between the sensor and the magnet.

As the output of the analog Hall sensor, if the magnetic flux of the magnet acting thereon is zero, half the source voltage is outputted. The output voltage increases or decreases in the piercing direction of the magnetic flux as the magnet approaches or moves away. Since the direction of the magnetic flux piercing through the analog Hall sensor is the same while the source voltage is constant, the change in the output remains half the change in the source voltage.

Figure 20:
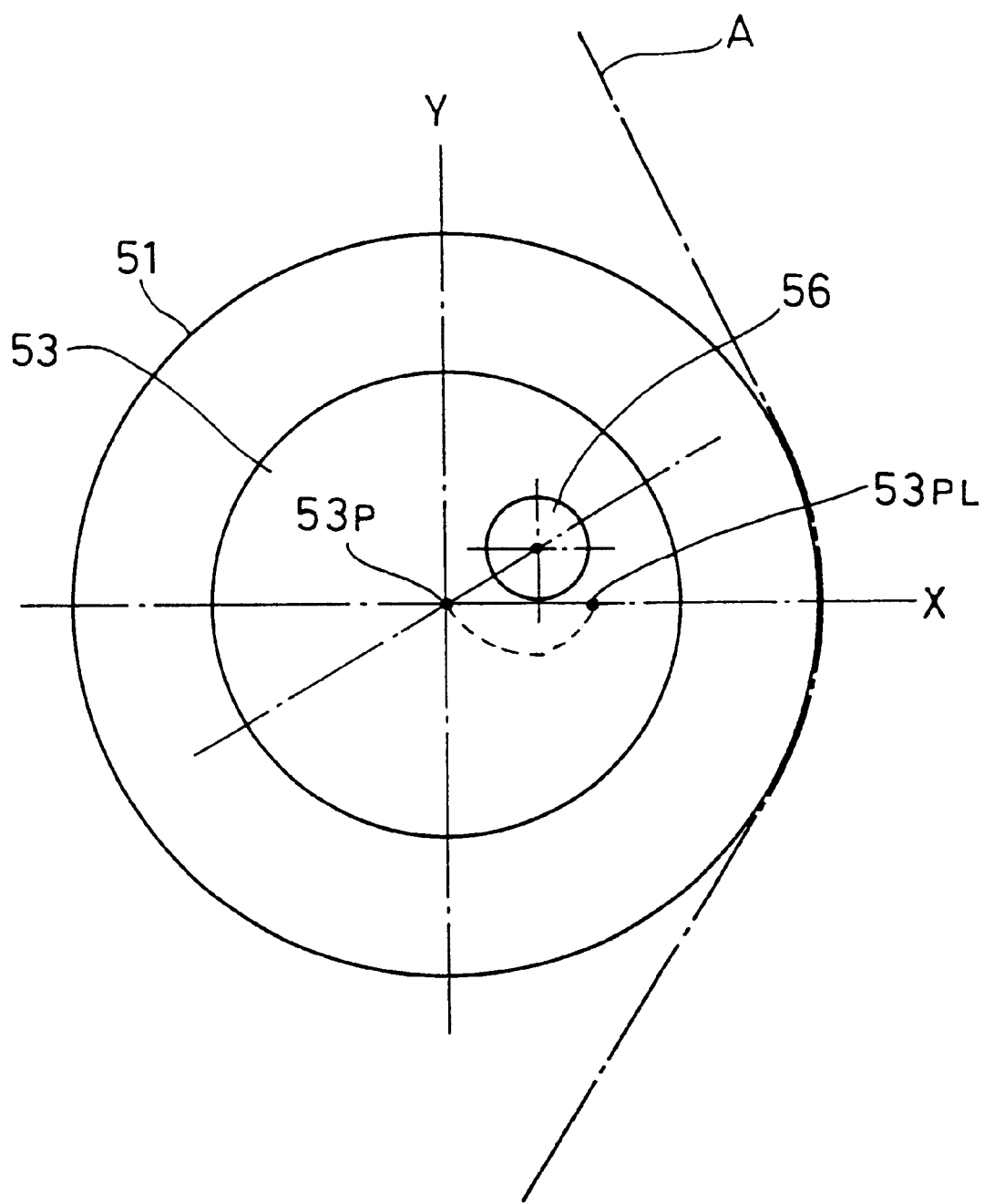

Thus, the detector unit can detect the position of the pulley 51 continuously or at multiple points. FIG. 20 shows how the geometric center 53P of the pulley 51 moves between two limit points 53P and 53PL along an arc from the state shown in FIG. 17 to the state shown in FIG. 19.

The relationship between the sensor-to-magnet distance and the position of the geometric center 53P of the pulley 51 is determined by geometric shapes and arrangements of various parts of the tension adjustor including the fixing bolt 56, eccentric ring 53 and pulley 51. Thus, by "teaching" the detecting circuit 40 this relationship beforehand, the detecting circuit 40 can detect the position of the pulley 51 by detecting the moving distance of the rod 92 or 122.

Figure 21:
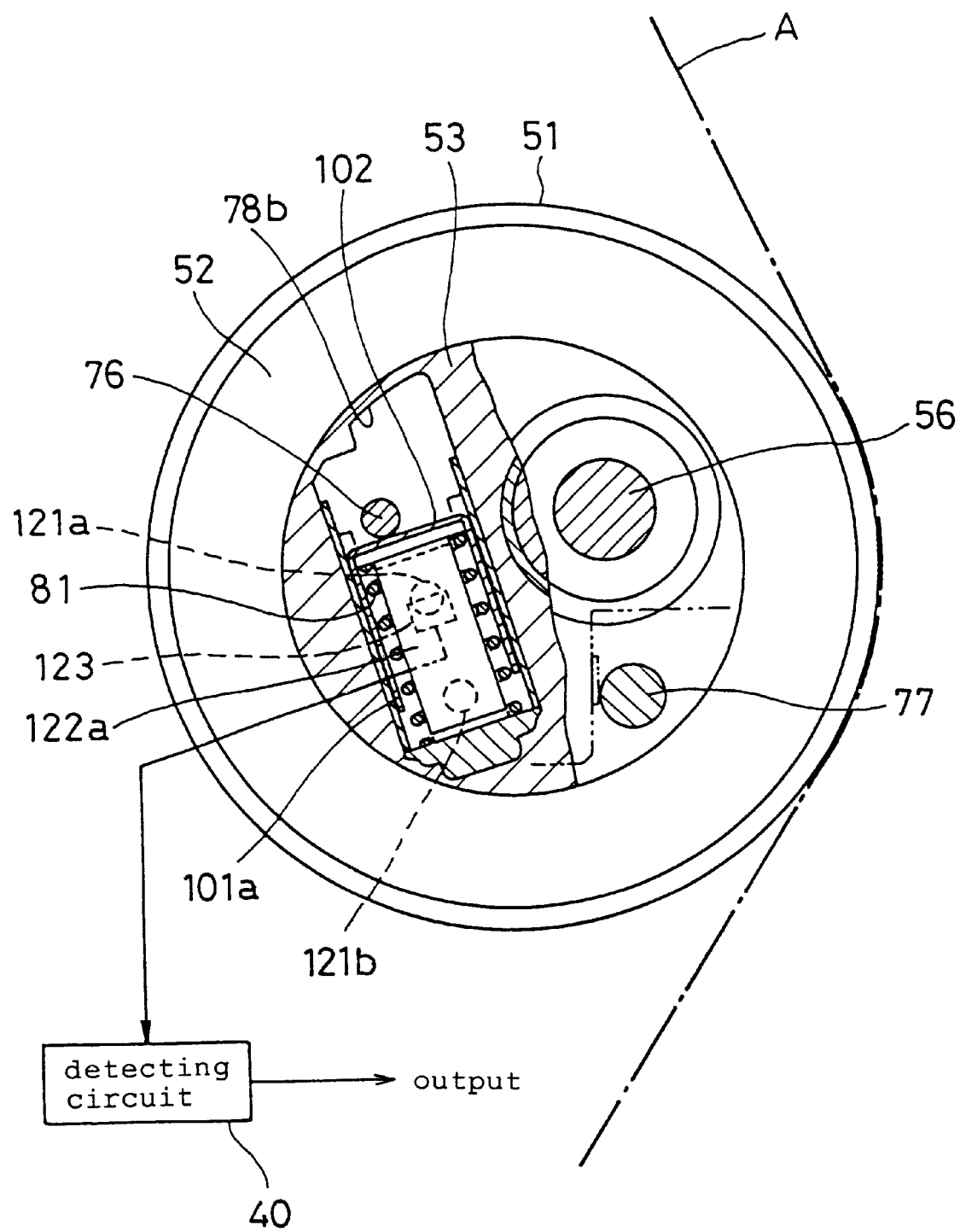
FIG. 21 is a side view similar to FIG. 16 of a belt tension adjustor of a second embodiment with a position detection unit.
Figure 22:
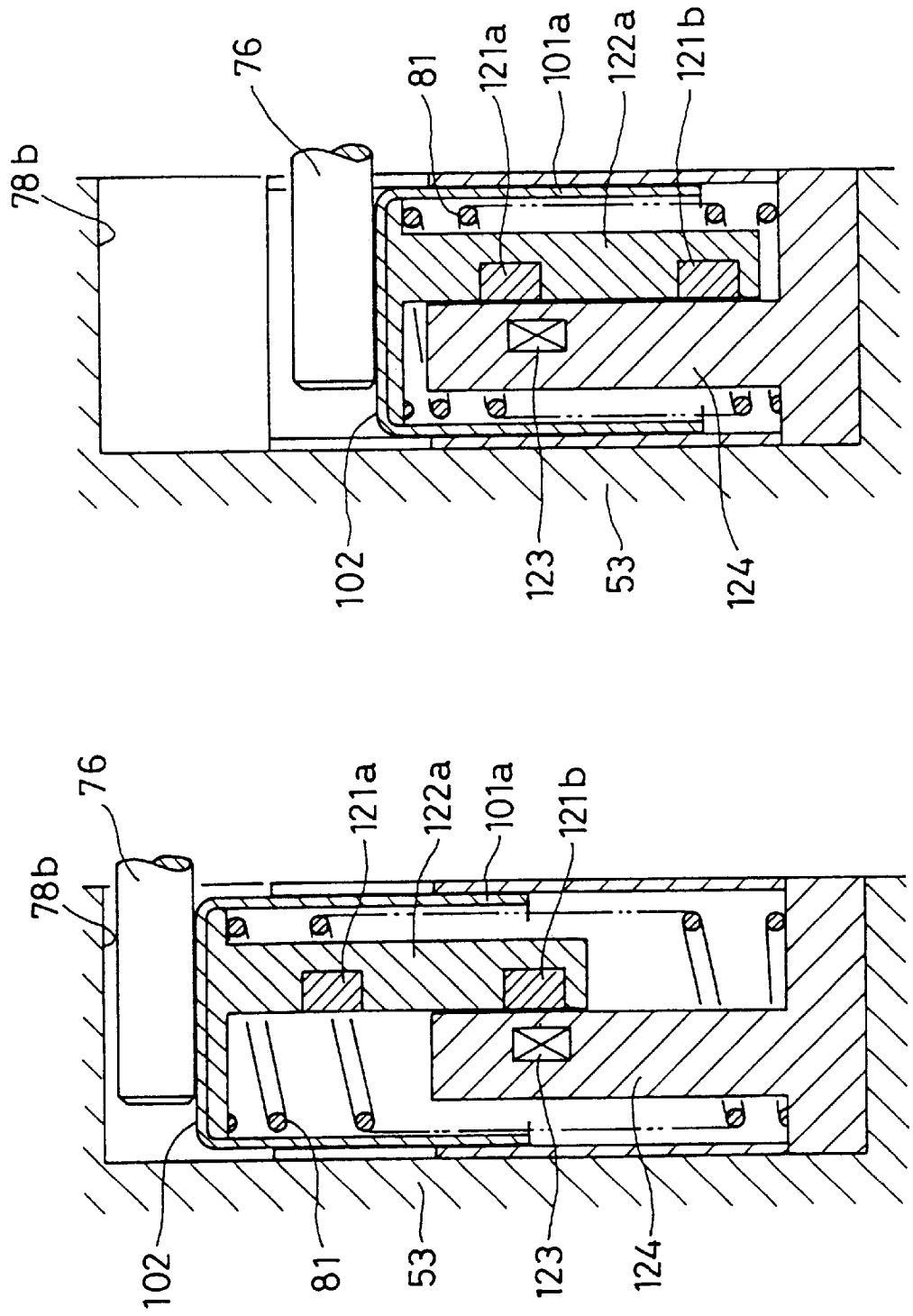
FIGS. 22A and 22B are sectional views of the position detection unit of FIG. 21.

FIGS. 21 and 22 show a second embodiment of the belt tension adjustor, which differs only in the structure of the position detector unit from the first embodiment.

As shown in FIG. 21, the detector unit includes a semi-cylindrical rod 122a on which are mounted axially magnetized and axially spaced cylindrical magnets 121a and 121b which are mounted so that the polarity differs. The direction of magnetic flux is perpendicular to the axis of the tension adjusting spring 81. The rod 122a is inserted in the spring 81 and immovably secured to the slide cap 102 by having its flange at one end thereof sandwiched between the bottom of the slide cap 102 and the spring 81. The detector unit further includes a semicylindrical sensor holder 124 inserted in the spring 81 opposite the rod 122a and having a magnetic sensor 123 embedded therein. The sensor holder 124 has a flanged end secured to the bottom of the sleeve 101. A lead wire connected to the sensor 123 extends outwardly through the flange of the holder 124. The parts are all housed in the recess 78b formed in the eccentric ring 53 (FIG. 22B).

The belt tension adjustor of this embodiment operates mechanically in exactly the same way as the adjustor of the first embodiment. Only the operation of the detector unit will be described. FIG. 22A shows a state when the tension pulley 51 is in its initial position, in which one magnet 121a is close to the sensor 123 and thus the magnetic flux passing through the sensor is maximum. As the tension in the belt A decreases, the eccentric ring pivots counterclockwise and the distance between the magnet 121a and the sensor 123 increases, while the distance between the other magnet 121b and the sensor 123 decreases. Thus, beyond one point, the latter distance becomes shorter than the former distance. This causes reversal of magnetic flux. FIG. 22B shows the state when the rod 92 has protruded to the maximum, where the reversed magnetic flux becomes maximum. If an analog output Hall sensor is used as the magnetic sensor 123, its output will change continuously within the range of the source voltage, so that compared with the arrangement of the first embodiment, the output change rate will be about two-fold. Thus the detecting sensitivity increases extremely.

Figure 23:
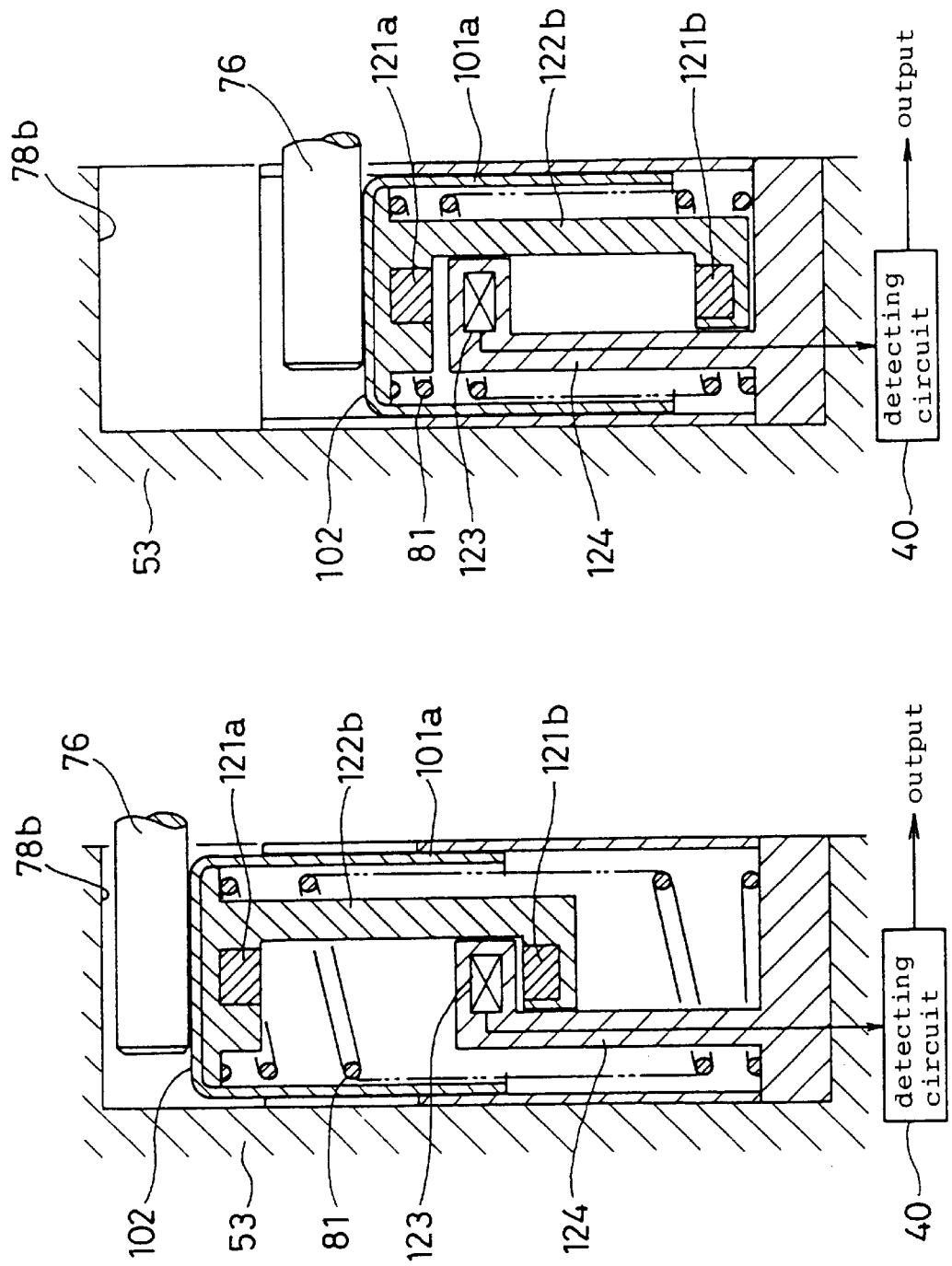
FIGS. 23A and 23B are views showing a modification of the position detection unit of FIG. 22.

FIGS. 23A and 23B show a modification of the second embodiment, in which the two magnets 121a and 121b are arranged in a slightly different manner from the second embodiment. That is, they are arranged such that the directions of the magnetic flux of the magnets 121a, 121b coincide with the axis of the spring 81 and that their polarity is such that the flux passing through the sensor 123 has directions opposite to each other. The detector unit of this modification operates in exactly the same way as the second embodiment.

Figure 24:
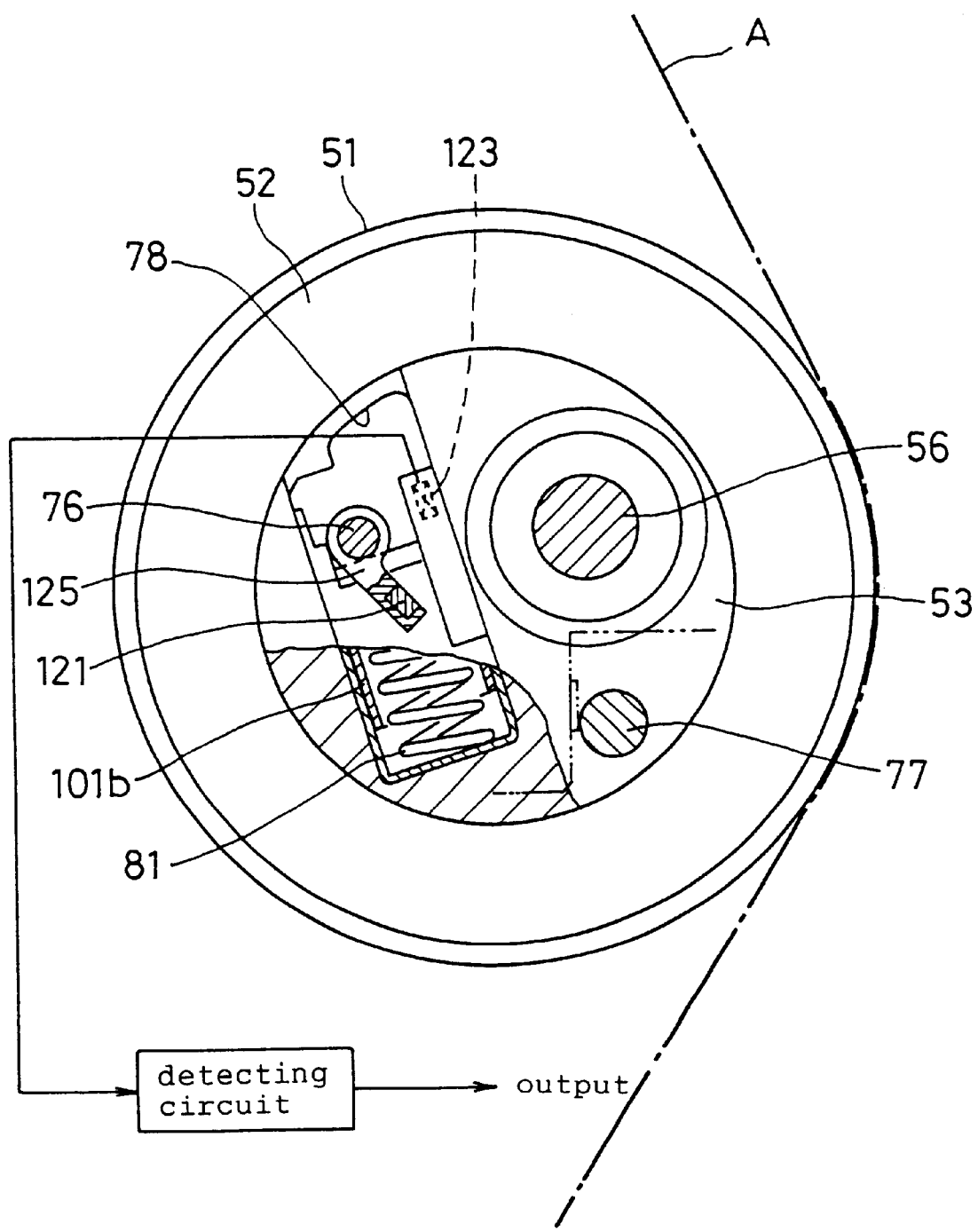
FIG. 24 is a side view similar to FIG. 16 of a belt tension adjustor of a third embodiment.
Figure 25:
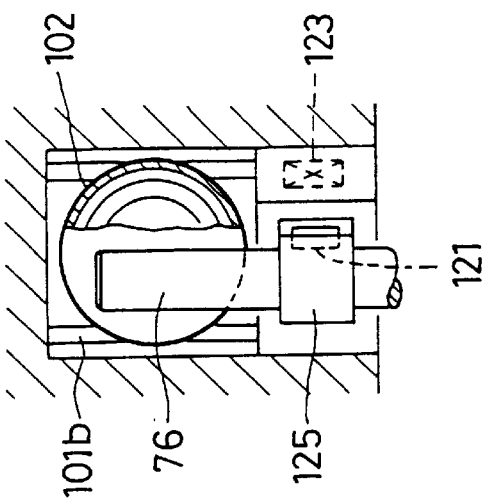
FIG. 25 is a partial sectional view of the same.

FIG. 24 shows a third embodiment of the belt tension adjustor. The belt tension adjustor of this embodiment operates in exactly the same way as that of the first embodiment. Only the detector unit is described. In this embodiment, a magnet 121 is buried in a lever 125 (FIG. 25) pressed on the pin 76. Since the lever 125 is fixed to the stationary pin 76, the magnet 121 does not pivot when the eccentric ring 53 pivots. Since the recess 78 formed in the eccentric ring is deeper than the recess 78a of the first embodiment, the lever 125 does not touch the inner wall of the recess 78 when the eccentric ring 53 pivots. A magnetic sensor 123 is embedded in a protrusion of the slide member 101b simultaneously when the protrusion is formed by molding.

Figure 26:
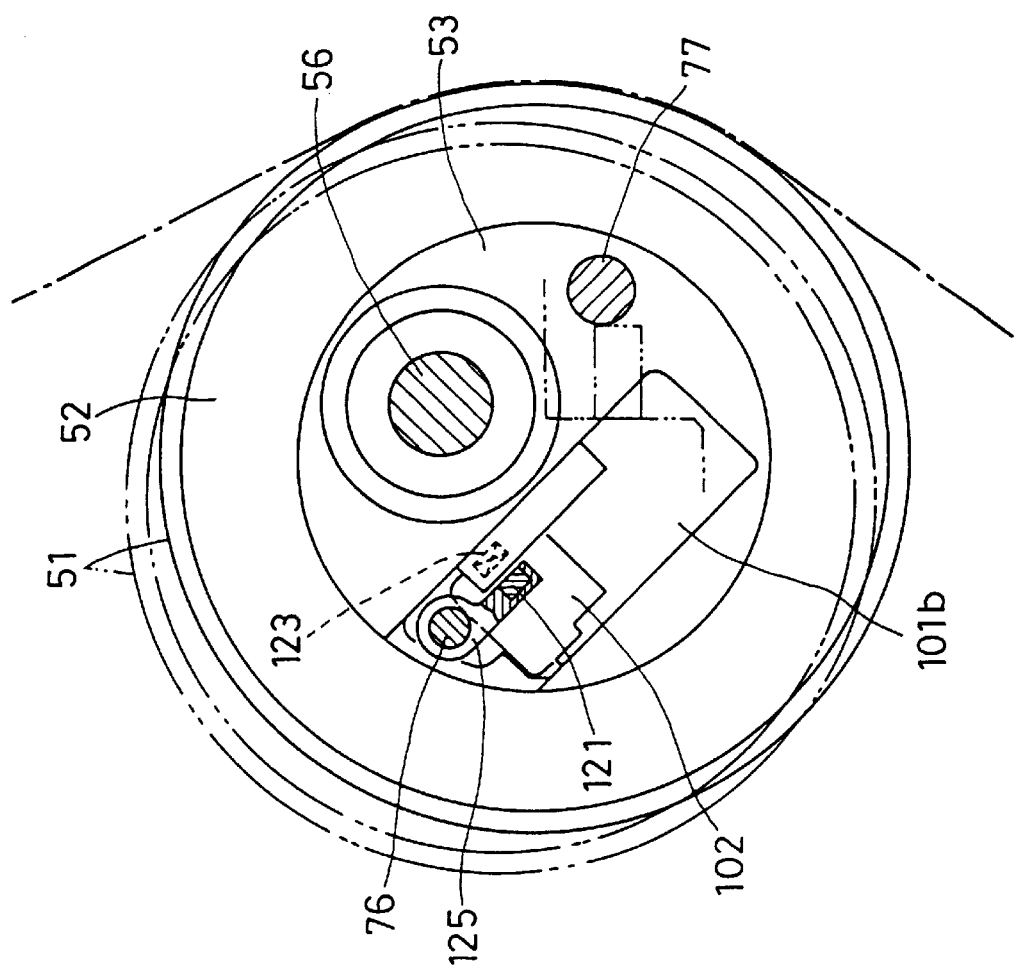
FIG. 26 is a side view of the same showing operation.

As the tension pulley 51 pivots from the initial position of FIG. 24 (where the magnet-to-sensor distance is maximum) toward the limit position of FIG. 26, where the tension pulley 51 has pivoted to its limit, the sensor 123 gradually approaches the stationary magnet 121 and thus the magnetic flux passing through the sensor gradually increases. Thus, by detecting the magnetic flux, it is possible to linearly detect the position of the eccentric ring.

FIGS. 27A and 27B show a fourth embodiment of the belt tension adjustor. The belt tension adjustor of this embodiment operates in exactly the same way as the adjustor of the first embodiment. Only the detector unit is described. In this embodiment, a magnet 121 is fitted in a cutout formed in a half ring 126 pressed onto the pin 77 pressed in the eccentric ring 53. A magnetic sensor 123 is embedded in a sensor holder 127 mounted on the body of the hydraulic damper 58 at such a position that the distance between the sensor 123 and the magnet 121 will be minimum when the tension pulley 51 has pivoted to its limit. In this embodiment, the sensor holder 127 is inserted in a tapered groove 128 formed in the damper body and retained in position by a pin 129, but may be mounted to the damper body in any other way.

Figure 28:
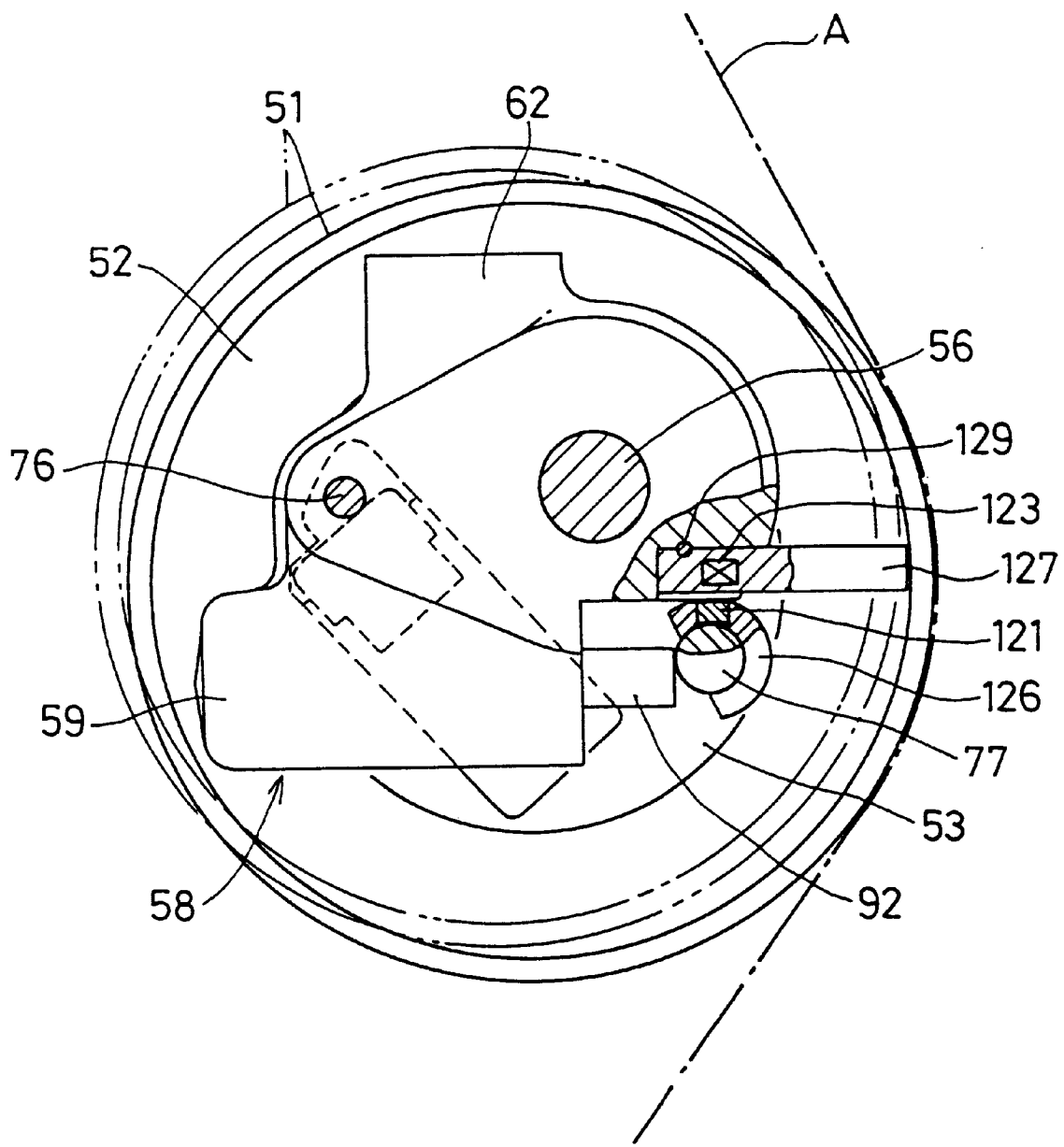
FIG. 28 is a side view of the same showing the operation.
Figure 30:
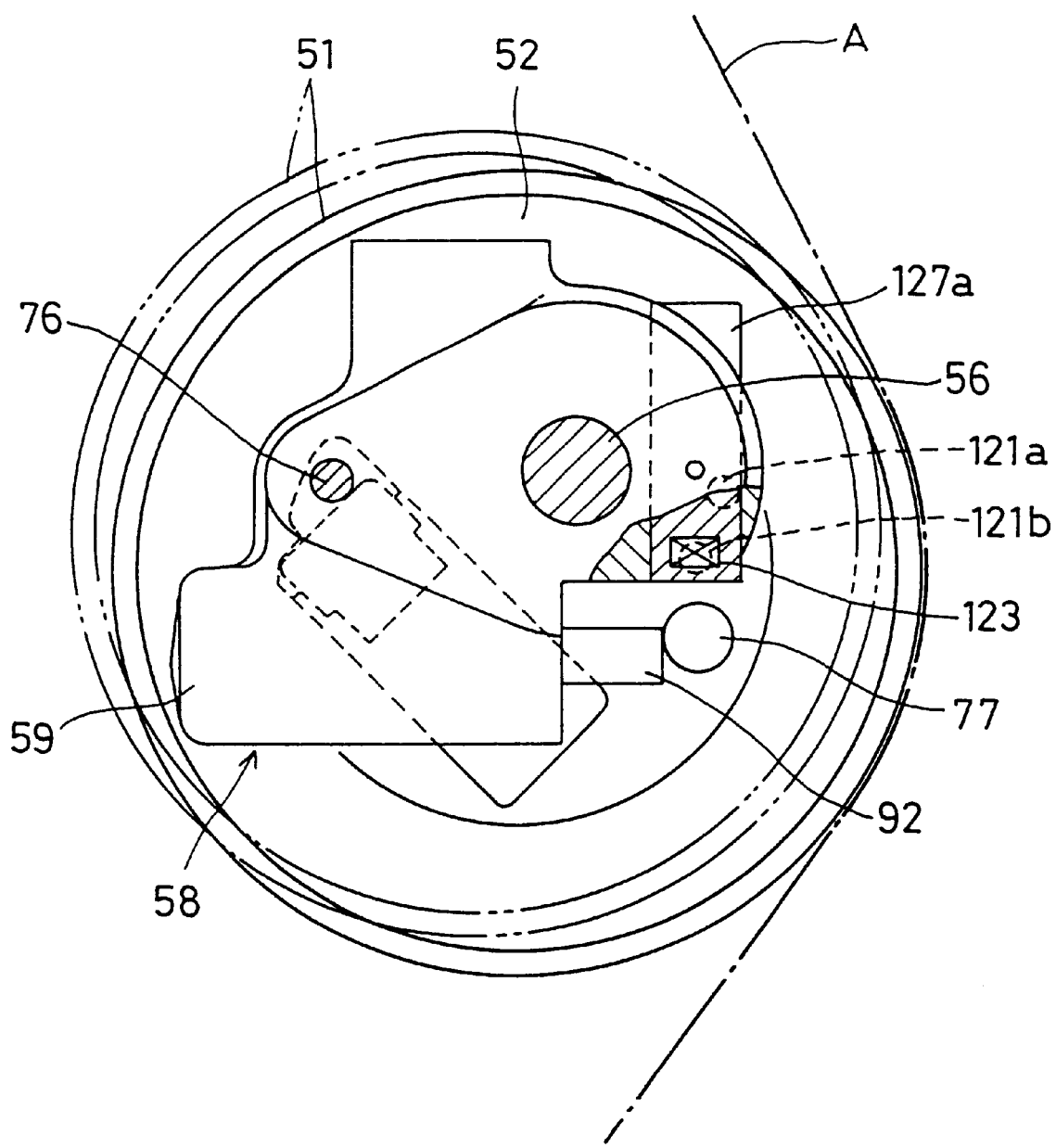

As the tension pulley 51 pivots from the initial position of FIG. 27A toward the limit position of FIG. 28, where the rod 92 has protruded to its limit, the magnet 121 gradually approaches the stationary sensor 123 and thus the magnetic flux passing through the sensor increases. Thus, by detecting the magnetic flux, it is possible to detect the position of the tension pulley linearly or at multiple points.

FIGS. 29A and 29B show a fifth embodiment of the belt tension adjustor. The belt tension adjustor of this embodiment operates in exactly the same way as that of the first embodiment. In this embodiment, two magnets 121a and 121b magnetized in the axial direction of the eccentric ring 53 are embedded in the eccentric ring, circumferentially spaced from each other, so that they have different polarities at the surfaces. A magnetic sensor 123 is embedded in a sensor holder 127a fitted in a circular hole formed in the body of the hydraulic damper 58. If the eccentric ring 53 is formed of a magnetic material, the magnets 121a, 121b may be enclosed in a non-magnetic material, to increase the density of flux passing through the sensor 123.

FIG. 29A shows a state when the tension pulley 51 is in its initial position, in which the magnet 121a is close to the sensor and thus the magnetic flux passing through the sensor is maximum. As the tension in the belt A decreases, the eccentric ring 53 pivots counterclockwise and the distance between the magnet 121a and the sensor 123 increases, while the distance between the magnet 121b and the sensor 123 decreases. Thus, at one point, the latter distance becomes shorter than the former. This causes reversal of direction of the magnetic flux. FIG. 29B shows the state when the rod 92 has protruded to the maximum, where the reversed magnetic flux is maximum. Thus, if an analog-output Hall sensor is used as the sensor, its output will change continuously within the source voltage. Substantially the same output can be obtained as in the second embodiment. One of the magnets 121a, 121b may be omitted.

Figure 31:
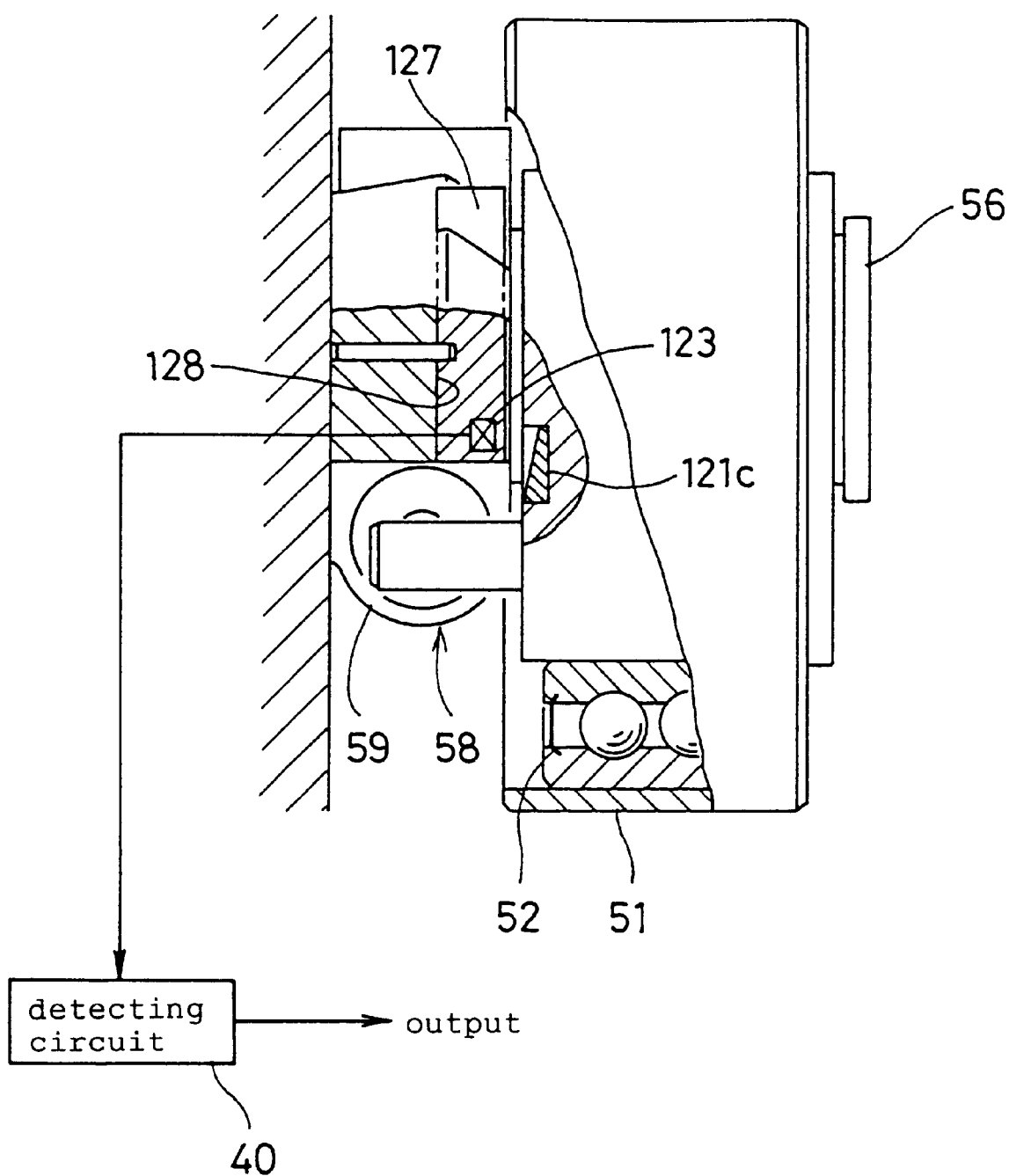
FIG. 31 is a modification of the fifth embodiment.

FIG. 31 shows a modification of the fifth embodiment, in which a substantially circumferentially tapered magnet 121c is used. With this arrangement, when the eccentric ring pivots in either direction, the distance between the sensor and the magnet 121c changes gradually. Thus, by detecting the magnetic flux, which changes as a function of the sensor-to-magnet distance, it is possible to linearly detect the position of the pulley. Or instead, only the limit position of the pulley may be detected by using a contact-output Hall sensor.

Figure 32:
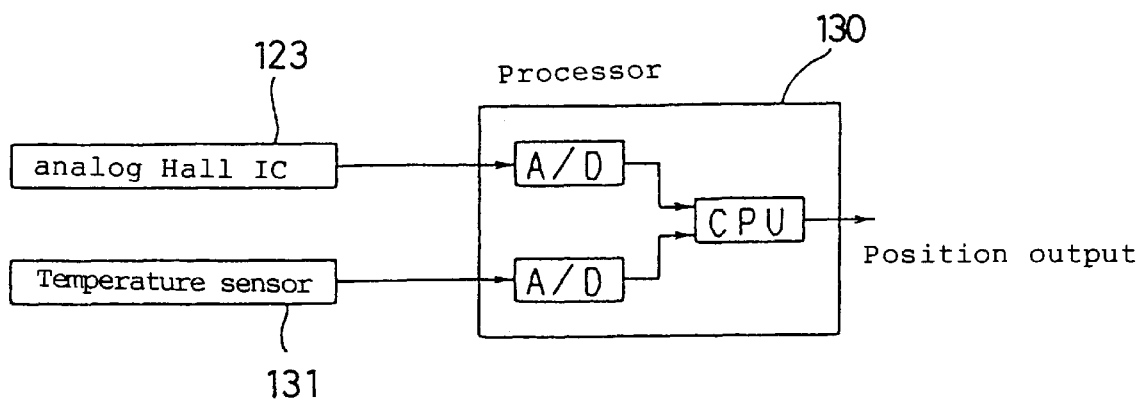
FIG. 32 is a diagram showing the temperature compensation circuit.
Figure 33:
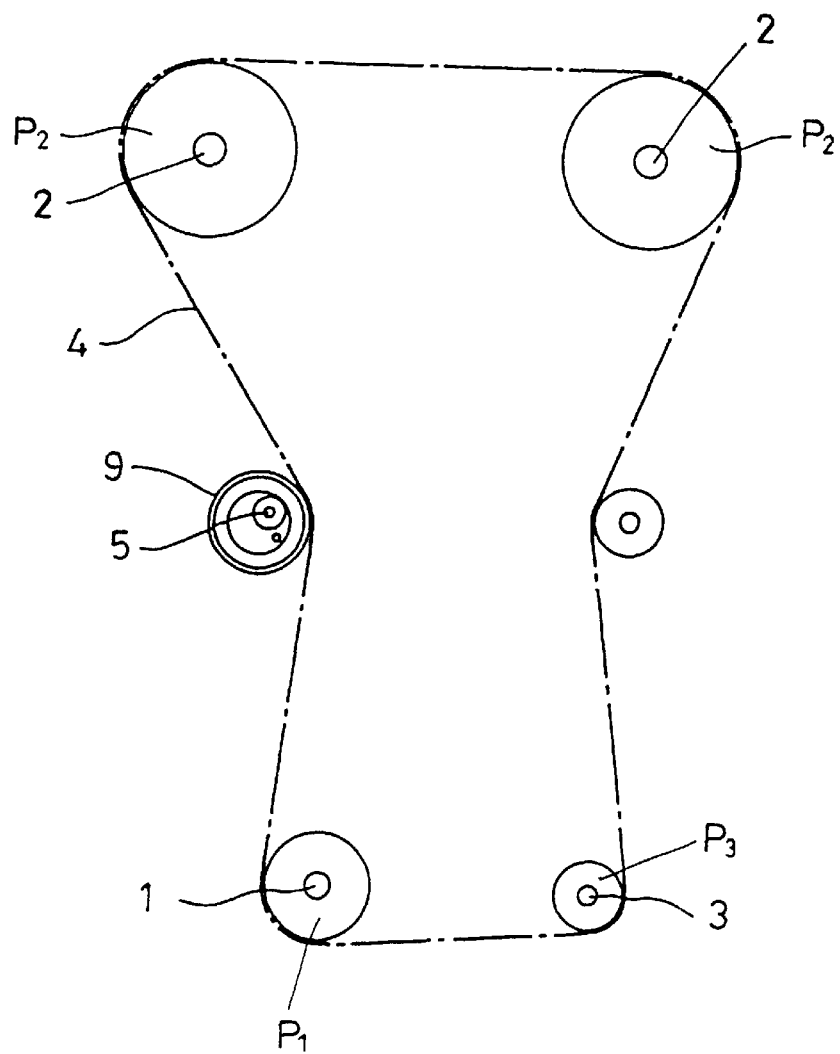
FIG. 33 is a view showing a belt transmission device on which the belt tension adjustor of this invention is used.

The magnetic force of a magnet weakens as the temperature rises. A Hall sensor used as a magnetic sensor has a temperature-dependent output offset. Thus, for accurate detection of the position of the pulley, the detector of any of the embodiments may be provided with a temperature-compensation means as shown in FIG. 32. Without such means some error can result with temperature change. This means comprises a temperature sensor 131 and a processor 130 including A/D converters for converting signals from the Hall sensor 123 and the temperature sensor 131 into digital signals, and a CPU programmed to correct the position detection signal from the magnetic sensor based on the temperature signal from the temperature sensor 131. The latter sensor may be embedded in a molded resin member. Instead of the temperature sensor 131, any existing temperature gauge used in various parts of the vehicle such as a temperature gauge for the radiator may be used. Such a correction means may be incorporated in a control unit for the vehicle.

As described in detail so far, in the piston rod detection mechanism of the present invention, for a piston rod of a cylinder unit, the detecting coil and the flange or the coil spring are provided to detect the position of the piston rod continuously or in a multiple-point manner by the detection signal based on change in the inductance coupling. Thus, it is possible to detect change in the amount of protrusion of the piston rod due to secular change of the cylinder unit or a device cooperating therewith. Also it is possible to know beforehand the timing for taking measures against deterioration of the cylinder unit or a similar device due to secular change with the detecting mechanism having a simple structure. Also, for the autotensioner and electromagnetic valve using this detecting mechanism, too, a similar effect is obtained. By combining a detecting coil with an exciting coil, the detecting sensitivity further improves.

As has been described above, with the belt tension adjusting device of this invention, a tension pulley is rotatably supported by an inner member, a tension adjusting spring and a hydraulic damper are provided to adjust tension, and the position of the tension pulley is detected by a magnetic sensor. Thus, by detecting the movement of the tension pulley to the limit position from the detection signal of the magnetic sensor, it is possible to know the timing for exchange of the timing belt and to indicate the exchange period or abnormality of the timing belt by sending this detection signal to a control unit (computer) and indicating it on a display.

What is claimed is:

1. A belt transmission device comprising: a pulley mounted on a crankshaft; a pulley mounted on a shaft to be driven; a belt trained around said pulleys to drive said shaft; an autotensioner including an engaging member, a cylinder, a pushrod mounted in said cylinder, a tension adjusting spring and a damper mechanism for damping the vibration of the belt through said engaging member; and a detecting unit for detecting the axial position of said pushrod continuously or at multiple points; wherein said detecting unit comprises a detecting coil provided at an opening of said cylinder and a flange provided on said pushrod opposite to said detecting coil, to thereby detect any change in the position of said pushrod based on a change in the inductance of said detecting coil with the change in the position of said flange.

2. The belt transmission device as claimed in claim 1 wherein said shaft is a camshaft, said engaging member comprising a tension pulley for tensioning the belt and a pulley arm pivotably supporting said tension pulley, said pushrod of said autotensioner being pressed against said pulley arm.

3. The belt transmission device as claimed in claim 1 wherein said autotensioner comprises a hydraulic autotensioner which utilizes both a gas and a liquid.

4. The belt transmission device as claimed in claim 1 wherein said cylinder has hydraulic oil therein, a piston is slidably mounted in said cylinder to partition said cylinder into a pressure chamber and a reservoir chamber, said pushrod is coupled to said piston so as to move axially with said piston and protrude out of said cylinder, and said tension adjusting spring biases said pushrod in a direction tending to cause said pushrod to protrude out of said cylinder.

5. The belt transmission device as claimed in claim 1 wherein a coil spring is mounted between said flange and said cylinder.

6. The belt transmission device as claimed in claim 1 wherein said flange is formed of a nonmagnetic conductive material.

7. A belt tension adjusting device comprising an inner member supported so as to be pivotable about a fixing bolt passing through an eccentric hole formed in said inner member, a tension pulley rotatably mounted on said inner member, a tension adjusting spring and a hydraulic damper for pivoting said inner member and thus said tension pulley to adjust tension of a belt, and a magnetic sensor for detecting the position of said tension pulley, wherein said tension adjusting spring is accommodated in said inner member, wherein a magnet is mounted inside said tension adjusting spring so as to move as said tension adjusting spring shrinks and expands, said magnetic sensor being fixed to said inner member to detect the position of said tension pulley.

8. The belt tension adjusting device as claimed in claim 7 wherein said magnet is provided so as to move along a straight line that passes said magnetic sensor, a straight line parallel thereto, or a rotation locus relative to said magnetic sensor, and mounted such that a gap between said magnet and said magnetic sensor changes as the belt stretches.

9. The belt tension adjusting device as claimed in claim 7 wherein said magnetic sensor is a Hall sensor which outputs a linear output or an ON-OFF signal.

10. The belt tension adjusting device as claimed in claim 7 wherein an output signal of said magnetic sensor is sent to a control circuit and a temperature sensor is provided parallel to said magnetic sensor, an output of said temperature sensor being sent to said control circuit for temperature compensation of the output signal of said magnetic sensor.

11. A belt tension adjusting device comprising an inner member supported so as to be pivotable about a fixing bolt passing through an eccentric hole formed in said inner member, a tension pulley rotatably mounted on said inner member, a tension adjusting spring and a hydraulic damper for pivoting said inner member and thus said tension pulley to adjust tension of a belt, and a magnetic sensor for detecting the position of said tension pulley, wherein said tension adjusting spring is accommodated in said inner member, wherein two magnets having different polarities are mounted inside said tension adjusting spring so as to move as said tension adjusting spring shrinks and expands, said magnetic sensor being fixed to said inner member to detect the position of said tension pulley.

12. The belt tension adjusting device as claimed in claim 11 wherein said magnetic sensor is a Hall sensor which outputs a linear output or an ON-OFF signal.

13. The belt tension adjusting device as claimed in claim 11 wherein an output signal of said magnetic sensor is sent to a control circuit and a temperature sensor is provided parallel to said magnetic sensor, an output of said temperature sensor being sent to said control circuit for temperature compensation of the output signal of said magnetic sensor.

14. A belt tension adjusting device comprising an inner member supported so as to be pivotable about a fixing bolt passing through an eccentric hole formed in said inner member, a tension pulley rotatably mounted on said inner member, a tension adjusting spring and a hydraulic damper for pivoting said inner member and thus said tension pulley to adjust tension of a belt, and a magnetic sensor for detecting the position of said tension pulley, wherein said tension adjusting spring is accommodated in said inner member, wherein a magnet is mounted on a pin supporting said tension adjusting spring, and wherein said magnetic sensor is fixed to said inner member so as to move relative to said magnet as said inner member pivots, to thereby detect the position of said inner member.

15. The belt tension adjusting device as claimed in claim 14 wherein said magnet is provided so as to move along a straight line that passes said magnetic sensor, a straight line parallel thereto, or a rotation locus relative to said magnetic sensor, and mounted such that a gap between said magnet and said magnetic sensor changes as the belt stretches.

16. The belt tension adjusting device as claimed in claim 14 wherein said magnetic sensor is a Hall sensor which outputs a linear output or an ON-OFF signal.

17. The belt tension adjusting device as claimed in claim 14 wherein an output signal of said magnetic sensor is sent to a control circuit and a temperature sensor is provided parallel to said magnetic sensor, an output of said temperature sensor being sent to said control circuit for temperature compensation of the output signal of said magnetic sensor.

18. A belt tension adjusting device comprising an inner member supported so as to be pivotable about a fixing bolt passing through an eccentric hole formed in said inner member, a tension pulley rotatably mounted on said inner member, a tension adjusting spring and a hydraulic damper for pivoting said inner member and thus said tension pulley to adjust tension of a belt, and a magnetic sensor for detecting the position of said tension pulley, wherein said tension adjusting spring is accommodated in said inner member, wherein a magnet is mounted on a pin provided on said inner member so as to support a rod which protrudes from said hydraulic damper, wherein said magnetic sensor is fixed to said hydraulic damper to detect the position of said tension pulley.

19. The belt tension adjusting device as claimed in claim 18 wherein said magnet is provided so as to move along a straight line that passes said magnetic sensor, a straight line parallel thereto, or a rotation locus relative to said magnetic sensor, and mounted such that a gap between said magnet and said magnetic sensor changes as the belt stretches.

20. The belt tension adjusting device as claimed in claim 18 wherein said magnetic sensor is a Hall sensor which outputs a linear output or an ON-OFF signal.

21. A belt tension adjusting device comprising an inner member supported so as to be pivotable about a fixing bolt passing through an eccentric hole formed in said inner member, a tension pulley rotatably mounted on said inner member, a tension adjusting spring and a hydraulic damper for pivoting said inner member and thus said tension pulley to adjust tension of a belt, and a magnetic sensor for detecting the position of said tension pulley, wherein said tension adjusting spring is accommodated in said inner member, wherein two magnets having different polarities are mounted on said inner member, and wherein said magnetic sensor is fixed to said hydraulic damper to detect the position of said tension pulley.

22. The belt tension adjusting device as claimed in claim 21 wherein said magnetic sensor is a Hall sensor which outputs a linear output or an ON-OFF signal.

23. The belt tension adjusting device as claimed in claim 21 wherein an output signal of said magnetic sensor is sent to a control circuit and a temperature sensor is provided parallel to said magnetic sensor, an output of said temperature sensor being sent to said control circuit for temperature compensation of the output signal of said magnetic sensor.

24. The belt tension adjusting device as claimed in claim 18 wherein an output signal of said magnetic sensor is sent to a control circuit and a temperature sensor is provided parallel to said magnetic sensor, an output of said temperature sensor being sent to said control circuit for temperature compensation of the output signal of said magnetic sensor.

25. The belt tension adjusting device as claimed in claim 21 wherein said magnet is provided so as to move along a straight line that passes said magnetic sensor, a straight line parallel thereto, or a rotation locus relative to said magnetic sensor, and mounted such that a gap between said magnet and said magnetic sensor changes as the belt stretches.

26. A belt tension adjusting device comprising an inner member supported so as to be pivotable about a fixing bolt passing through an eccentric hole formed in said inner member, a tension pulley rotatably mounted on said inner member, a tension adjusting spring and a hydraulic damper for pivoting said inner member and thus said tension pulley to adjust tension of a belt, and a magnetic sensor for detecting the position of said tension pulley, wherein said tension adjusting spring is accommodated in said inner member, wherein a tapered magnet is mounted on said inner member, and wherein said magnetic sensor is fixed to said hydraulic damper to detect the position of the tension pulley.

27. The belt tension adjusting device as claimed in claim 26 wherein said magnet is provided so as to move along a straight line that passes said magnetic sensor, a straight line parallel thereto, or a rotation locus relative to said magnetic sensor, and mounted such that a gap between said magnet and said magnetic sensor changes as the belt stretches.

28. The belt tension adjusting device as claimed in claim 26 wherein said magnetic sensor is a Hall sensor which outputs a linear output or an ON-OFF signal.

29. The belt tension adjusting device as claimed in claim 26 wherein an output signal of said magnetic sensor is sent to a control circuit and a temperature sensor is provided parallel to said magnetic sensor, an output of said temperature sensor being sent to said control circuit for temperature compensation of the output signal of said magnetic sensor.

30. A belt tension adjusting device comprising an inner member supported so as to be pivotable about a fixing bolt passing through an eccentric hole formed in said inner member, a tension pulley rotatably mounted on said inner member, a tension adjusting spring and a hydraulic damper for pivoting said inner member and thus said tension pulley to adjust tension of a belt, and a magnetic sensor for detecting the position of said tension pulley, wherein an output signal of said magnetic sensor is sent to a control circuit and a temperature sensor is provided parallel to said magnetic sensor, an output of said temperature sensor being sent to said control circuit for temperature compensation of the output signal of said magnetic sensor.

31. A belt tension adjusting device comprising an inner member supported so as to be pivotable about a fixing bolt passing through an eccentric hole formed in said inner member, a tension pulley rotatably mounted on said inner member, a tension adjusting spring and a hydraulic damper for pivoting said inner member and thus said tension pulley to adjust tension of a belt, and a magnetic sensor for detecting the position of said tension pulley, wherein a magnet is provided so as to move along a straight line that passes said magnetic sensor, a straight line parallel thereto, or a rotation locus relative to said magnetic sensor, and mounted such that a gap between said magnet and said magnetic sensor changes as the belt stretches.

32. A belt tension adjusting device comprising an inner member supported so as to be pivotable about a fixing bolt passing through an eccentric hole formed in said inner member, a tension pulley rotatably mounted on said inner member, a tension adjusting spring and a hydraulic damper for pivoting said inner member and thus said tension pulley to adjust tension of a belt, and a magnetic sensor for detecting the position of said tension pulley, wherein an output signal of said magnetic sensor is sent to a control circuit and a temperature sensor is provided parallel to said magnetic sensor, an output of said temperature sensor being sent to said control circuit for temperature compensation of the output signal of said magnetic sensor.

* * * * *